(12) United States Patent
Gladwin et al.

(10) Patent No.: US 8,966,311 B2
(45) Date of Patent: Feb. 24, 2015

(54) MAINTENANCE FREE STORAGE CONTAINER STORAGE MODULE ACCESS

(75) Inventors: S. Christopher Gladwin, Chicago, IL (US); Jason K. Resch, Chicago, IL (US); Gary W. Grube, Barrington Hills, IL (US); Timothy W. Markison, Mesa, AZ (US)

(73) Assignee: Cleversafe, Inc., Chicago, IL (US)

(*) Notice: Subject to any disclaimer, the term of this patent is extended or adjusted under 35 U.S.C. 154(b) by 351 days.

(21) Appl. No.: 13/527,959

(22) Filed: Jun. 20, 2012

(65) Prior Publication Data
US 2013/0013960 A1   Jan. 10, 2013

Related U.S. Application Data

(60) Provisional application No. 61/505,010, filed on Jul. 6, 2011.

(51) Int. Cl.
*G06F 11/00* (2006.01)
*G06F 11/10* (2006.01)

(52) U.S. Cl.
CPC .... *G06F 11/1084* (2013.01); *G06F 2211/1028* (2013.01); *G06F 11/1096* (2013.01)
USPC ............. 714/6.21; 714/6.2; 714/15; 711/114; 709/216

(58) Field of Classification Search
CPC ............ G06F 11/2094; G06F 11/1092; G06F 11/0727; G06F 11/187; G06F 11/20; G06F 3/065; G06F 3/0629; G06F 3/0685; G06F 3/0688; G06F 3/0689
USPC .............. 714/6.21, 15, 6.2; 709/216; 711/114
See application file for complete search history.

(56) References Cited

U.S. PATENT DOCUMENTS

| | | | |
|---|---|---|---|
| 4,092,732 A | | 5/1978 | Ouchi |
| 5,454,101 A | | 9/1995 | Mackay et al. |
| 5,485,474 A | | 1/1996 | Rabin |
| 5,566,316 A | * | 10/1996 | Fechner et al. ............... 711/114 |
| 5,774,643 A | | 6/1998 | Lubbers et al. |
| 5,802,364 A | | 9/1998 | Senator et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Joshua P Lottich
*Assistant Examiner* — Jeison C Arcos
(74) *Attorney, Agent, or Firm* — Garlick & Markison; Timothy W. Markison

(57) ABSTRACT

A method begins by a processing module determining failure mode information for a plurality of storage modules of a maintenance-free storage container. The method continues with the processing module managing storage mapping information of data content within the plurality of storage modules based on the failure mode information and receiving a data access request. The method continues with the processing module interpreting the data access request based on the storage mapping information to identify one or more of the plurality of storage modules to produce one or more identified storage modules and generating an in-container data access request based on the data access request and the one or more identified storage modules. The method continues with the processing module sending the in-container data access request to the one or more identified storage modules.

15 Claims, 21 Drawing Sheets

(56) References Cited

U.S. PATENT DOCUMENTS

| | | |
|---|---|---|
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0184731 A1* | 8/2006 | Corbett et al. ............ 711/114 |
| 2006/0224603 A1 | 10/2006 | Correll, Jr. |
| 2007/0078901 A1* | 4/2007 | Satou et al. ............ 707/200 |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2008/0147821 A1* | 6/2008 | Dietrich et al. ............ 709/216 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0182025 A1* | 7/2011 | Abrahamson ............ 361/679.33 |
| 2012/0290877 A1* | 11/2012 | Grube et al. ............ 714/15 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

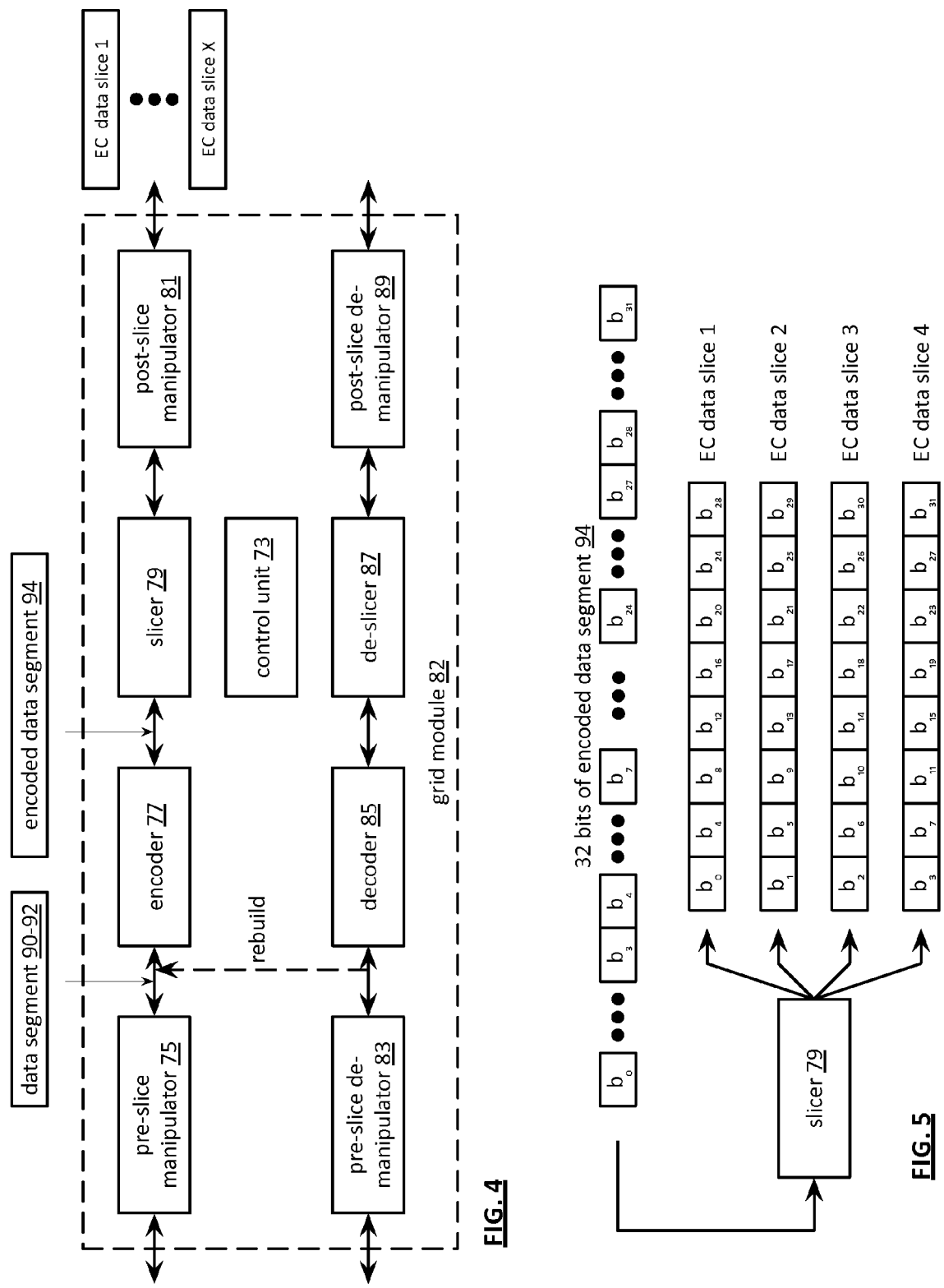

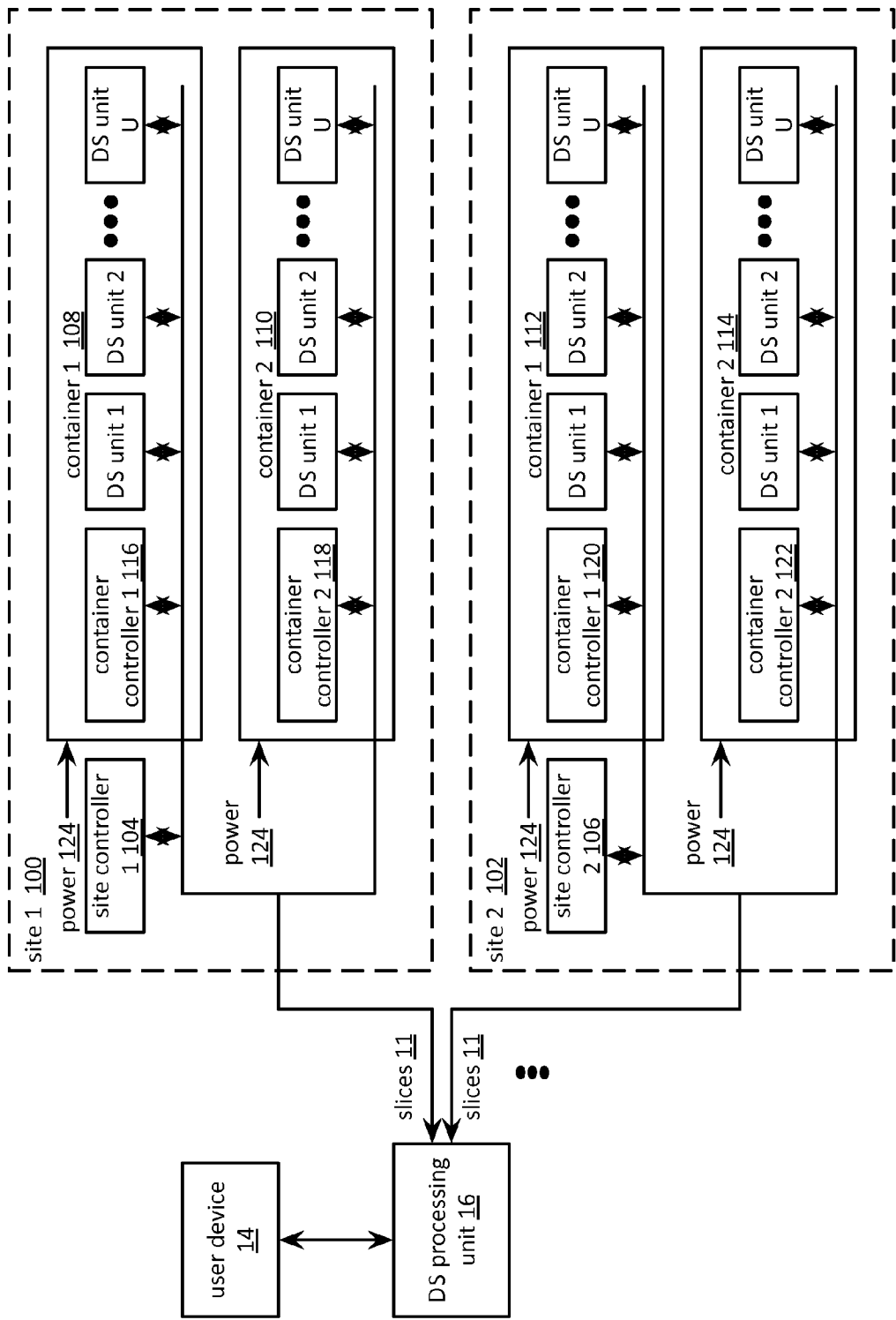

front view 264 top view 266 side view 262

MAINTENANCE FREE STORAGE CONTAINER STORAGE MODULE ACCESS

CROSS REFERENCE TO RELATED PATENTS

The present U.S. Utility patent application claims priority pursuant to 35 U.S.C. §119(e) to U.S. Provisional Application No. 61/505,010, entitled "Optimizing a Container Based Dispersed Storage Network," filed Jul. 6, 2011, which is incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming, etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., $n-1$=capacity). RAID 6 can recover from a loss of two discs and requires a minimum of four discs with a storage capacity of $n-2$.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 6 is a schematic block diagram of another embodiment of a computing system in accordance with the present invention;

DETAILED DESCRIPTION OF THE INVENTION

Figure 1:
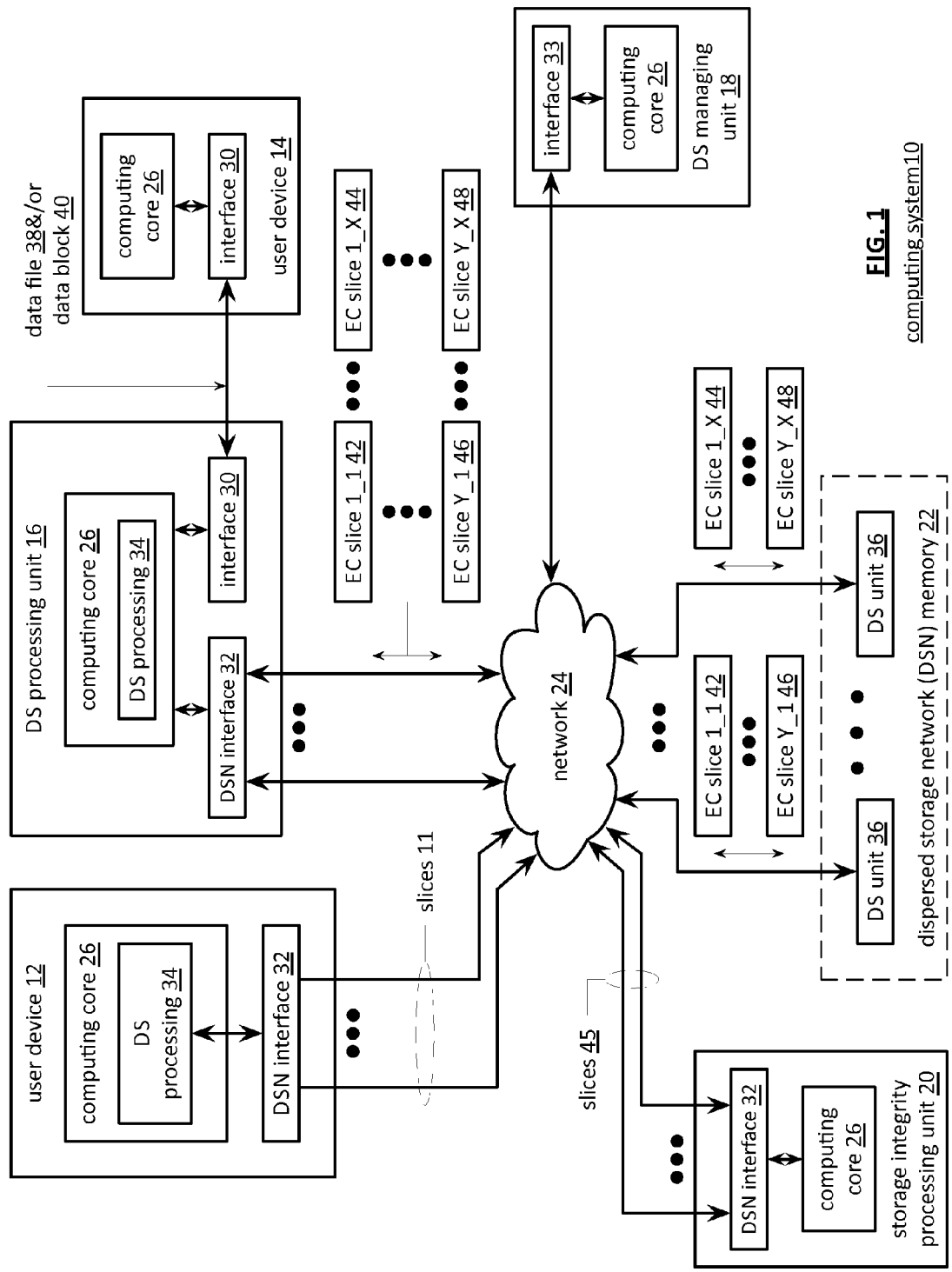
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
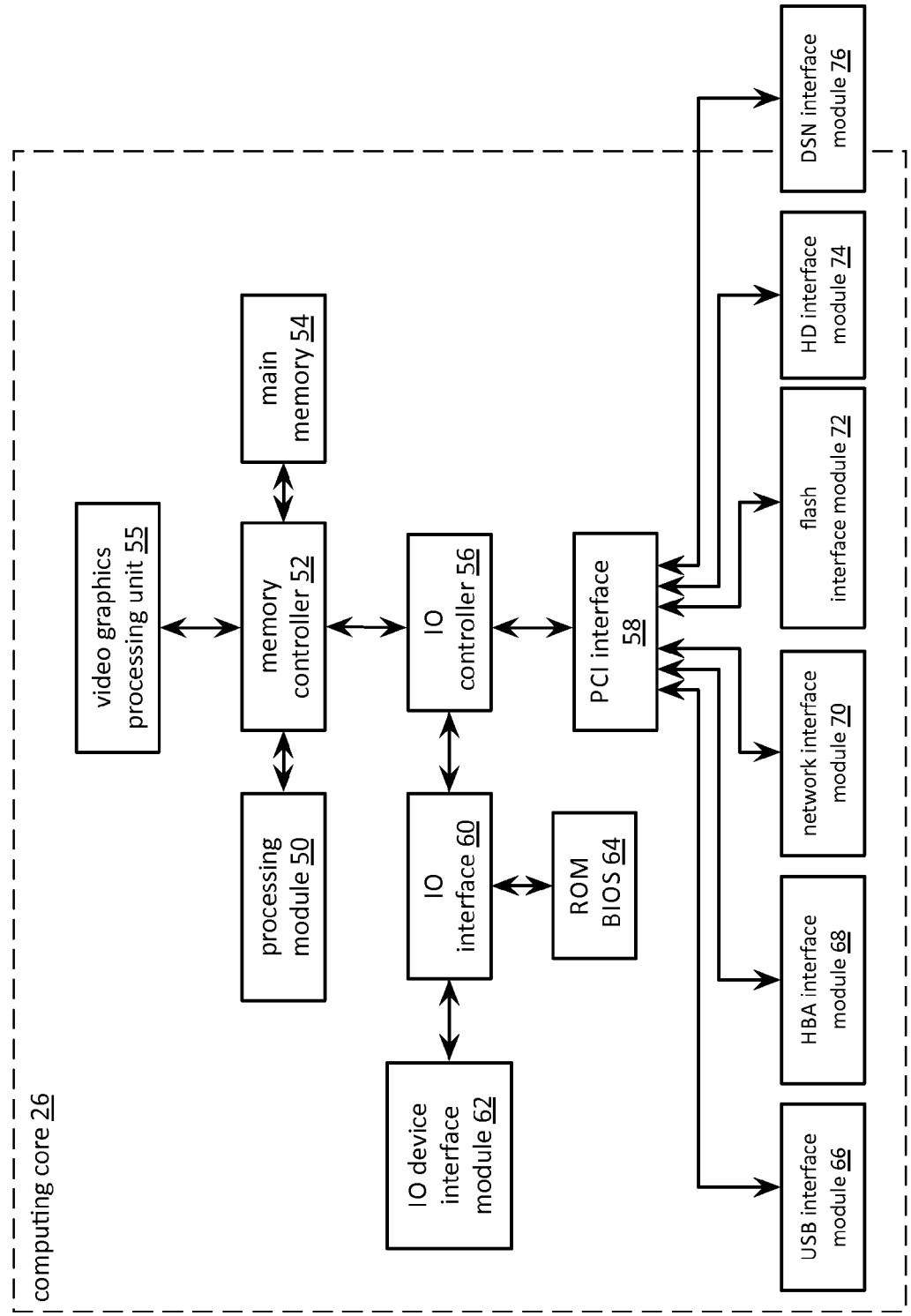
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
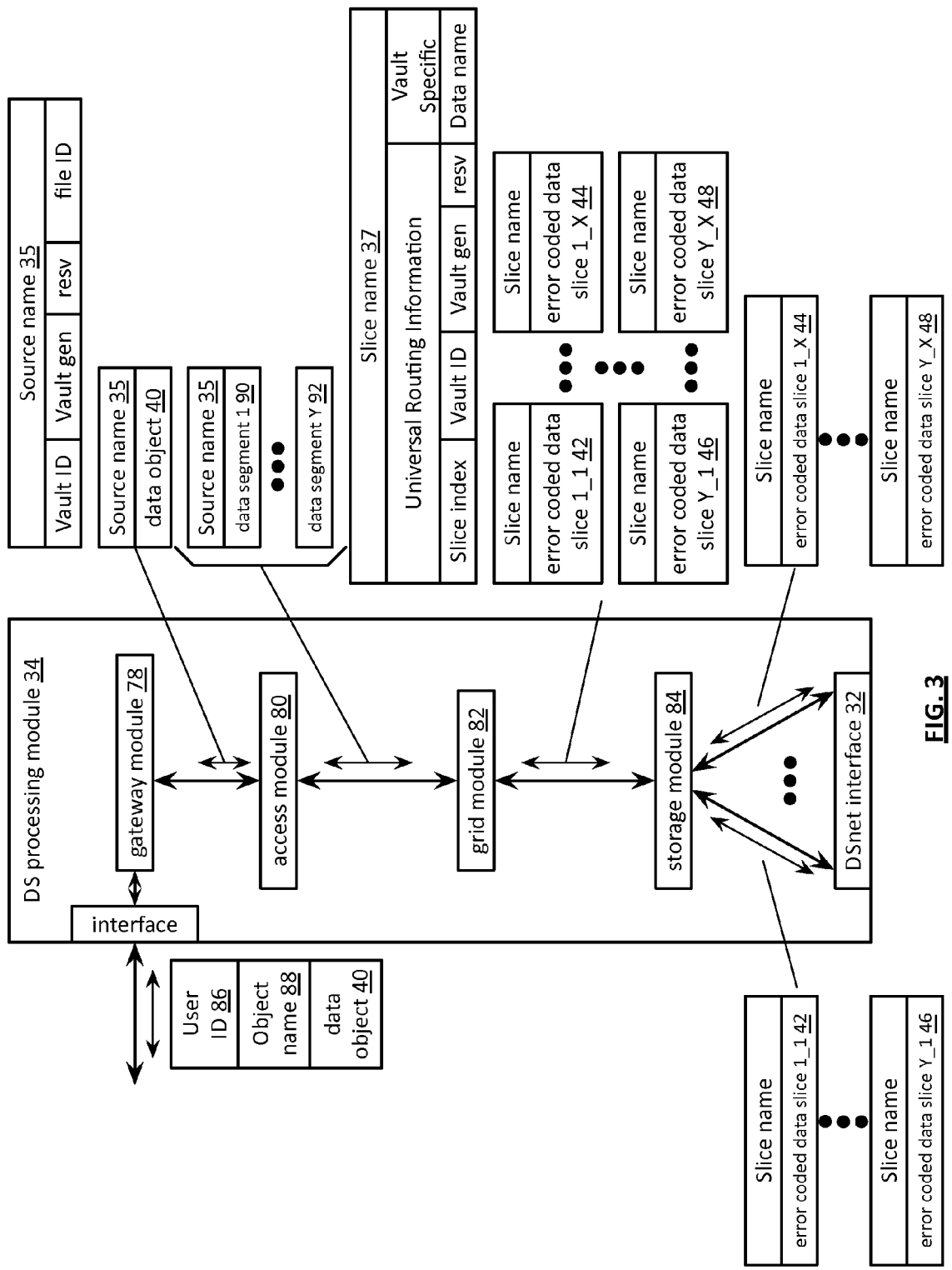
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

FIG. 6 is a schematic block diagram of another embodiment of a computing system. The system includes a user device 14, a dispersed storage (DS) processing unit 16, and a plurality of sites 100, 102. Each site of the plurality of sites 100, 102 may be located at different geographic locations providing geographic diversity. The sites provide a physical installation environment, required power, and network connectivity (e.g., wireline and/or wireless) to other sites of a dispersed storage network (DSN). Each site of the plurality of sites hosts one or more maintenance free containers of a plurality of containers 108-114 and each site hosts at least one site controller of a plurality of site controllers 104-106. For each site, the at least one site controller may be implemented as a separate computing unit (e.g., a server) or as a function within one or more of the one or more containers.

Each container (e.g., a shipping container, a box, a sealed environment, a tanker, a thermal control pool) of the one or more containers includes one or more of network connectivity, one or more DS units 1-U (e.g., storage servers), at least one container controller of a plurality of container controllers 116-122, environmental control (e.g., heating and cooling), and a power input 124. The at least one container controller may be implemented as a separate computing unit or as a function within the one or more DS units 1-U. For example, container 1 108 at site 1 100 includes a container controller 1 116 and DS units 1-U associated with container 1 108 and container 2 110 at site 1 100 includes a container controller 2 118 and DS units 1-U associated with container 2 110.

The at least one site controller assists in container operations associated with a common site. For example, site controller 1 104 receives an access request from DS processing unit 16 and facilitates access to the one or more containers 108-110 associated with site controller 1 104. As another example, site controller 1 104 facilitates migration of stored encoded data slices 11 from container 1 108 of site 1 100 to container 2 110 of site 1 100 based on migration criteria.

The at least one container controller assists in container operations associated with the at least one container controller. For example, container controller 2 122 of container 2 114 of site 2 102 receives an access request from DS processing unit 16 and facilitates access to the one or more DS units 1-U associated with the container controller 2 122. As another example, container controller 1 120 of container 1 112 of site 2 102 facilitates migration of stored encoded data slices 11 from DS unit 2 of container 1 112 of site 2 102 to DS unit 10 of container 1 112 of site 2 102 based on migration criteria.

In an example of storing data, encoded data slices 11 associated with each pillar of a pillar width number of a set of encoded data slices are stored within a common container. For instance, the DS processing unit 16 dispersed storage error encodes data to produce a plurality of sets of encoded data slices 11, wherein each set of the plurality of sets of encoded data slices includes four pillars of encoded data slices when a pillar width is four. Next, the DS processing unit 16 facilitate storage of each set of four encoded data slices of the plurality of sets of encoded data slices 11 in DS units 1-4 of container 1 108 at site 1 100. In an example of retrieving the data, the DS processing unit 16 facilitates retrieval of at least three encoded data slices 11 from DS units 1-4 of container 1 108 at site 1 100 when a decode threshold is three. In an example of rebuilding an encoded data slice of a set of the plurality of sets of encoded data slices, container controller 1 116 at site 1 100 retrieves at least three encoded data slices 11 from DS units 1-4 of container 1 108 at site 1 100 and dispersed storage error decodes the at least three encoded data slices to reproduce a data segment associated with an encoded data slice to be rebuilt. Next, the container controller 1 116 at site 1 100 dispersed storage error encodes the data segment to reproduce the data slice to be rebuilt.

In another example storing data, encoded data slices associated with each pillar of the pillar with number of the set of encode slices are stored within two or more containers of a common site. For instance, a DS processing unit 16 facilitates storage of two encoded data slices of each set of four encoded data slices of the plurality of sets of encoded data slices 11 in DS units 1-2 of container 1 112 at site 2 102 and facilitates storage of a remaining two encoded data slices of each set of four encoded data slices of the plurality of sets of encoded data slices in DS units 1-2 of container 2 114 at site 2 102.

In an example of retrieving the data, the DS processing unit 16 facilitates retrieval of at least three encoded data slices 11 from DS units 1-2 of container 1 112 at site 2 102 and DS units 1-2 of container 2 114 at site 2 102. In an example of rebuilding an encoded data slice of a set of the plurality of sets of encoded data slices 11, site controller 2 106 at site 2 102 retrieves at least three encoded data slices 11 from DS units 1-2 of container 1 112 at site 2 102 and DS units 1-2 of container 2 114 at site 2 102 and dispersed storage error decodes the at least three encoded data slices to reproduce a data segment associated with an encoded data slice to be rebuilt. Next, the site controller 2 106 at site 2 102 dispersed storage error encodes the data segment to reproduce the data slice to be rebuilt.

Figure 7:
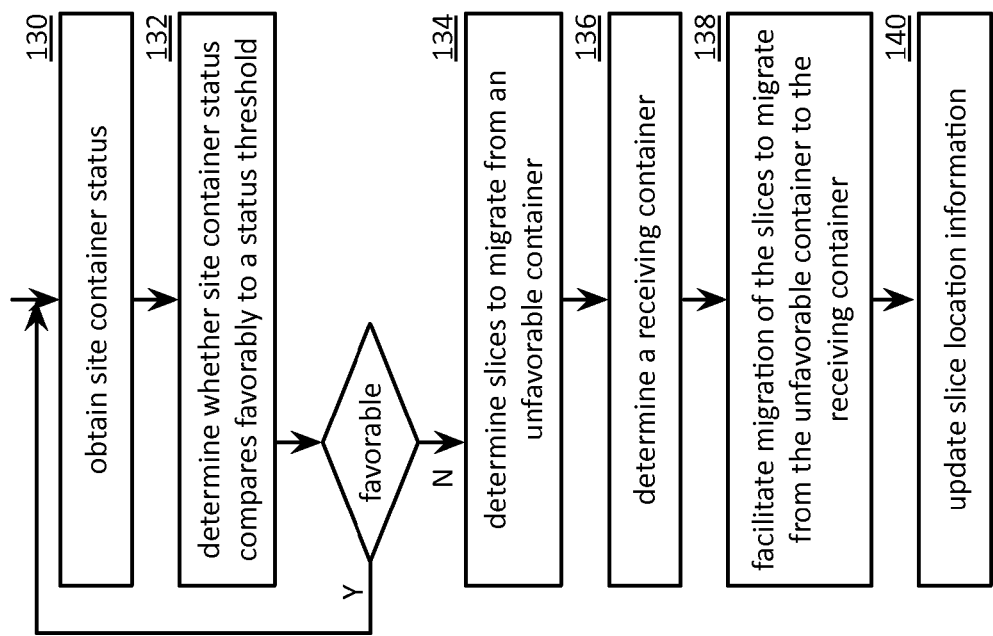
FIG. 7 is a flowchart illustrating an example of migrating slices in accordance with the present invention.

FIG. 7 is a flowchart illustrating an example of migrating slices. The method begins at step 130 where a processing model (e.g., a site controller) obtains site container status. The site container status includes a container status indicator for one more maintenance free storage containers of a common site. The container status indicator includes one or more of a container loading indicator, a container performance indicator, and a container environmental indicator. The obtaining may be based on one or more of a query, a test, sensor data, a record lookup, and an error message.

The method continues at step 132 where the processing module determines whether the site container status compares favorably to a status threshold. The status threshold includes one or more of a loading threshold, a performance threshold, and an environmental indicator threshold. The determining includes determining whether a container status associated with each container of a common site compares favorably to the status threshold. For example, the processing module determines that the site container status compares unfavorably to the status threshold when a container environmental indicator indicates that a container temperature is less than a low temperature environmental indicator threshold. As another example, the processing module determines that the site container status compares unfavorably to the status threshold when the container performance indicator is less than the performance threshold. As yet another example, the processing module determines that the site container status compares unfavorably to the status threshold when the container loading indicator is greater than the loading threshold. The method loops back to step 130 when the processing module determines that the site container status compares favorably to the status threshold. The method continues to step 134 when the processing module determines that the site container status compares unfavorably to the status threshold.

The method continues at step 134 where the processing module determines slices to migrate from an unfavorable container associated with the unfavorable comparison. The determining includes identifying slice names of a subset of a plurality of slices stored in dispersed storage (DS) units of the unfavorable container based on one or more of the site container status, a nature of the unfavorable comparison, and migration table. For example, the processing module determines to move all slices of the plurality of slices when a nature of the unfavorable comparison is a high temperature environmental indicator. As another example, the processing module determines to move half of the plurality of slices when a nature of the unfavorable comparison is a high container loading indicator.

The method continues at step 136 where the processing module determines a receiving container. The determining includes selecting a container that includes DS units associated with a site container status that compares favorably to a receiving container threshold. For example, the processing module selects a site container that has favorable loading capacity when the nature of the unfavorable comparison is the high container loading indicator.

The method continues at step 138 where the processing module facilitates migration of the slices to migrate from the unfavorable container to the receiving container. The facilitating includes at least one of sending a migration request to a site controller associated with the unfavorable container, wherein the request includes the slice names to migrate, and retrieving the slices to migrate and sending the slices to migrate to one of DS units of the receiving container and a site controller of the receiving container.

The method continues at step 140 where the processing module updates slice location information. The slice location information includes one or more of a slice name, a corresponding container identifier, and a corresponding DS unit identifier. The updating includes at least one of modifying a local slice location information table and sending a location table update request that includes one or more of the slice name, the corresponding container identifier, and the corresponding DS unit identifier.

Figure 8:
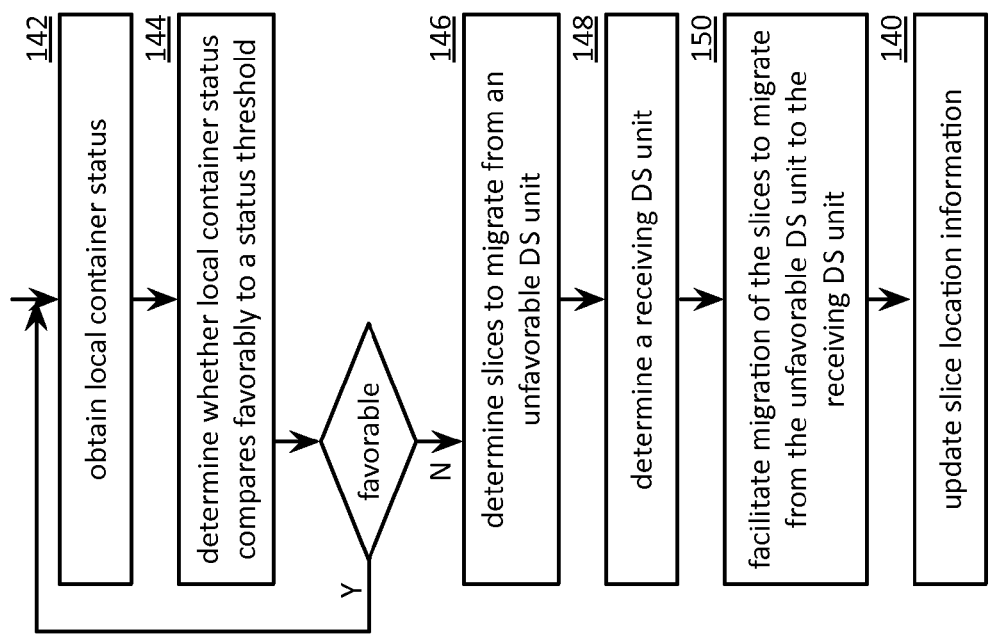
FIG. 8 is a flowchart illustrating another example of migrating slices in accordance with the present invention.

FIG. 8 is a flowchart illustrating another example of migrating slices, which include similar steps to FIG. 7. The method begins at step 142 where a processing model (e.g., a container controller) obtains local container status. The local container status includes a dispersed storage (DS) unit status indicator for one more DS units of a common container. The DS unit status indicator includes one or more of a DS unit loading indicator, a DS unit performance indicator, and a DS unit environmental indicator. The obtaining may be based on one or more of a query, a test, sensor data, a record lookup, and an error message.

The method continues at step 144 where the processing module determines whether the local container status compares favorably to a status threshold. The status threshold includes one or more of a loading threshold, a performance threshold, and an environmental indicator threshold. The determining includes determining whether a DS unit status associated with each DS unit of a common container compares favorably to the status threshold. For example, the processing module determines that the local container status compares unfavorably to the status threshold when a DS unit environmental indicator indicates that a cont DS unit temperature is greater than a high temperature environmental indicator threshold. As another example, the processing module determines that the local container status compares unfavorably to the status threshold when a DS unit performance indicator is less than the performance threshold. As yet another example, the processing module determines that the local container status compares unfavorably to the status threshold when a DS unit available memory indicator is less than an available memory threshold. The method loops back to step 142 when the processing module determines that the local container status compares favorably to the status threshold. The method continues to step 146 when the processing module determines that the local container status compares unfavorably to the status threshold.

The method continues at step 146 where the processing module determines slices to migrate from an unfavorable DS unit associated with the unfavorable comparison. The determining identifies slice names of a subset of a plurality of slices stored in the DS unit based on one or more of the local container status, a nature of the unfavorable comparison, and migration table. For example, the processing module determines to move all slices of the plurality of slices when a nature of the unfavorable comparison is a DS unit of high temperature environmental indicator. As another example, the processing module determines to move half of the plurality of slices when a nature of the unfavorable comparison is a high DS unit loading indicator.

The method continues at step 148 where the processing module determines a receiving DS unit. The determining includes selecting a DS unit associated with a local container status that compares favorably to a receiving local container threshold. For example, the processing module selects a DS unit that has favorable loading capacity when the nature of the unfavorable comparison is a high DS unit loading indicator.

The method continues at step 150 where the processing module facilitates migration of the slices to migrate from the unfavorable DS unit to the receiving DS unit. The facilitation includes at least one of sending a migration request to the unfavorable DS unit, wherein the request includes the slice names to migrate, and retrieving the slices to migrate from the unfavorable DS unit and sending the slices to migrate to one of the receiving DS unit and a container controller associated with the receiving DS unit. The method continues with step 140 of FIG. 7 where the processing module updates slice location information such that the slices are associated with the receiving DS unit and not associated with the unfavorable DS unit.

Figure 9:
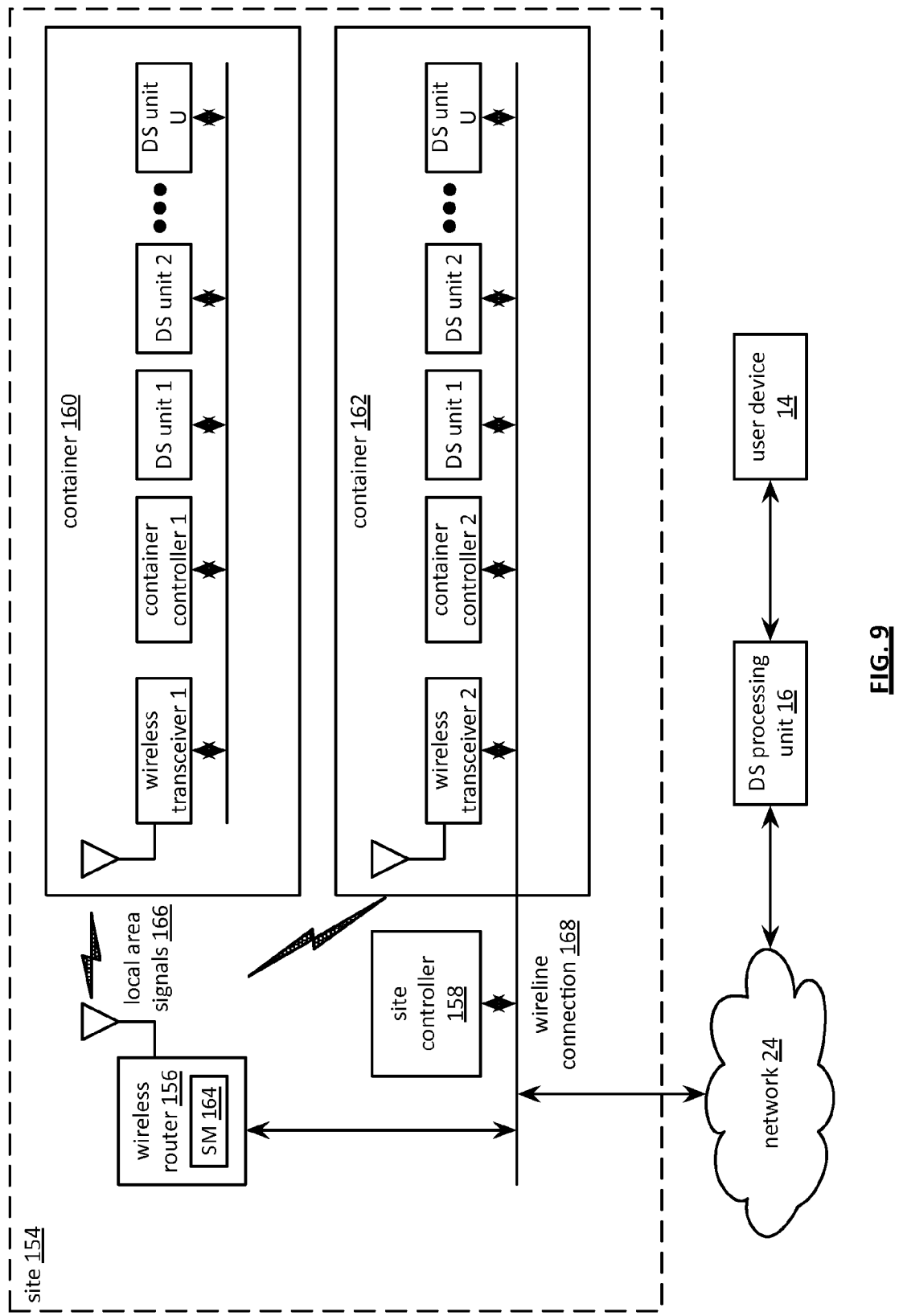
FIG. 9 is a schematic block diagram of another embodiment of a computing system in accordance with the present invention.

FIG. 9 is a schematic block diagram of another embodiment of a computing system that includes a site 154, a network 24, a dispersed storage (DS) processing unit 16, and a user device 14. The site 154 includes a wireless router 156, a site controller 158, a containers 160-162. The wireless router 156 includes a slice memory 164. The slice memory may include a temporary slice memory (e.g., for storing encoded data slices on a temporary basis) and a non-temporary slice memory (e.g., for storing encoded data slices on a non-temporary basis).

The wireless router 156 may operate in accordance with one or more industry standards (e.g., WIFI, Bluetooth, global system for mobile communications (GSM), code division multiple access (CDMA), etc.) to transmit and receive local area signals 166. The wireless router 156 is further operable to convert slices into local area signals 166 for transmission to the containers 160-162 and to convert received local area signals 166 from containers 160-162 into slices.

The containers 160-162 include a wireless transceiver 1-2, a container controller 1-2, and DS units 1-U. The wireless transceivers 1-2 converts received local area signals 166 from the wireless router 156 into slices and converts slices into local area signals 166 for transmission to the wireless router 156. The wireless transceivers 1-2 may operate in accordance with one or more industry standards (e.g., WIFI, Bluetooth, global system for mobile communications (GSM), code division multiple access (CDMA), etc.) to receive and transmit local area signals 166.

The containers 160-162 may be operably coupled to the network 24 via at least one of the local area signals 166 and a wireline connection 168. For example, container 160 couples to network 24 via the local area signals 166 and container 162 couples to network 24 via the local area signals 166 and the wireline connection 168. The site controller 158 assigns the containers 1-2 to dispersed storage network (DSN) storage tasks based on available connectivity. For example, the site controller 158 assigns container 162 to accommodate heavier storage traffic when available connectivity includes a highest bandwidth wireline connection to container 162. As another example, the site controller 158 assigns container 160 to accommodate low priority storage traffic when the available connectivity includes a moderate bandwidth wireless connection to container 160. As yet another example, the site controller 158 assigns container 160 to accommodate new storage traffic when the available connectivity includes sufficient bandwidth wireless connection to container 160 and container 160 includes more available storage capacity than container 162. For instance, container 160 is implemented in site 154 by connecting temporary power and utilizing wireless connectivity rather than establishing wireline connectivity.

Figure 10:
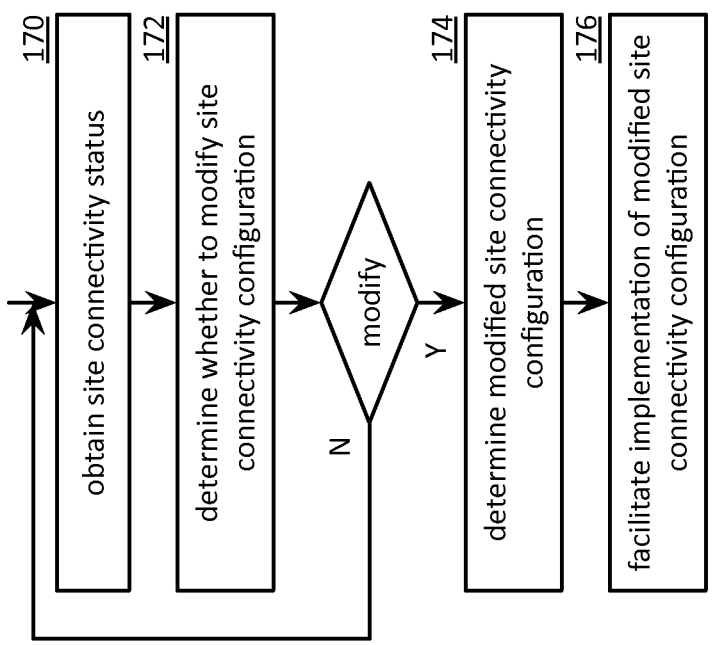
FIG. 10 is a flow chart illustrating an example of modifying connectivity in accordance with the present invention.

FIG. 10 is a flow chart illustrating an example of modifying connectivity. The method begins at step 170 where a processing module (e.g., a site controller) obtains site connectivity status. The site connectivity status includes one or more of a wireless connectivity availability indicator, a wireline connectivity availability indicator, a wireless connectivity performance indicator, and a wireline connectivity performance indicator. The obtaining may be based on one or more of a query, a test, sensor data, a record lookup, and an error message.

The method continues at step 172 where the processing module determines whether to modify site connectivity configuration. The configuration includes one or more of utilizing a wireline connection and utilizing a wireless connection. The determining may be based on one or more of the site connectivity status, a site connectivity status threshold, and a comparison of the site connectivity status to the site connectivity status threshold. For example, the processing module determines to modify the site connectivity configuration when a wireless connectivity performance indicator is less than a wireless connectivity status threshold. As another example, the processing module determines to modify the site connectivity configuration when a wireline connectivity availability indicator indicates that a wireline connection is no longer available. The method loops back to step 170 when the processing module determines not to modify the site connectivity configuration. The method continues to step 174 when the processing module determines to modify the site connectivity configuration.

The method continues at step 174 where the processing module determines a modified site connectivity configuration. The determining may be based on one or more of identifying a connectivity issue, discovering connectivity alternatives, quantifying connectivity alternatives, and selecting a connectivity alternative. For example, the processing module determines the modified site connectivity configuration such that an additional connectivity path is utilized (e.g., adding wireless connectivity to wireline connectivity when the wireline connectivity alone did not satisfy a performance requirement). As another example, the processing module determines the modified site connectivity configuration such that an alternative connectivity path is utilized (e.g., utilizing wireline connectivity instead of wireless connectivity when the wireline connectivity is associated with greater bandwidth than the wireless connectivity and bandwidth was identified as a connectivity issue).

The method continues at step 176 where the processing module facilitates implementation of the modified site connectivity configuration. The facilitation includes one or more of updating routing tables, sending a reconfiguration message to one or more elements within a site, sending a reconfiguration message to an external element, and testing elements of the system associated with the new configuration.

Figure 11A:
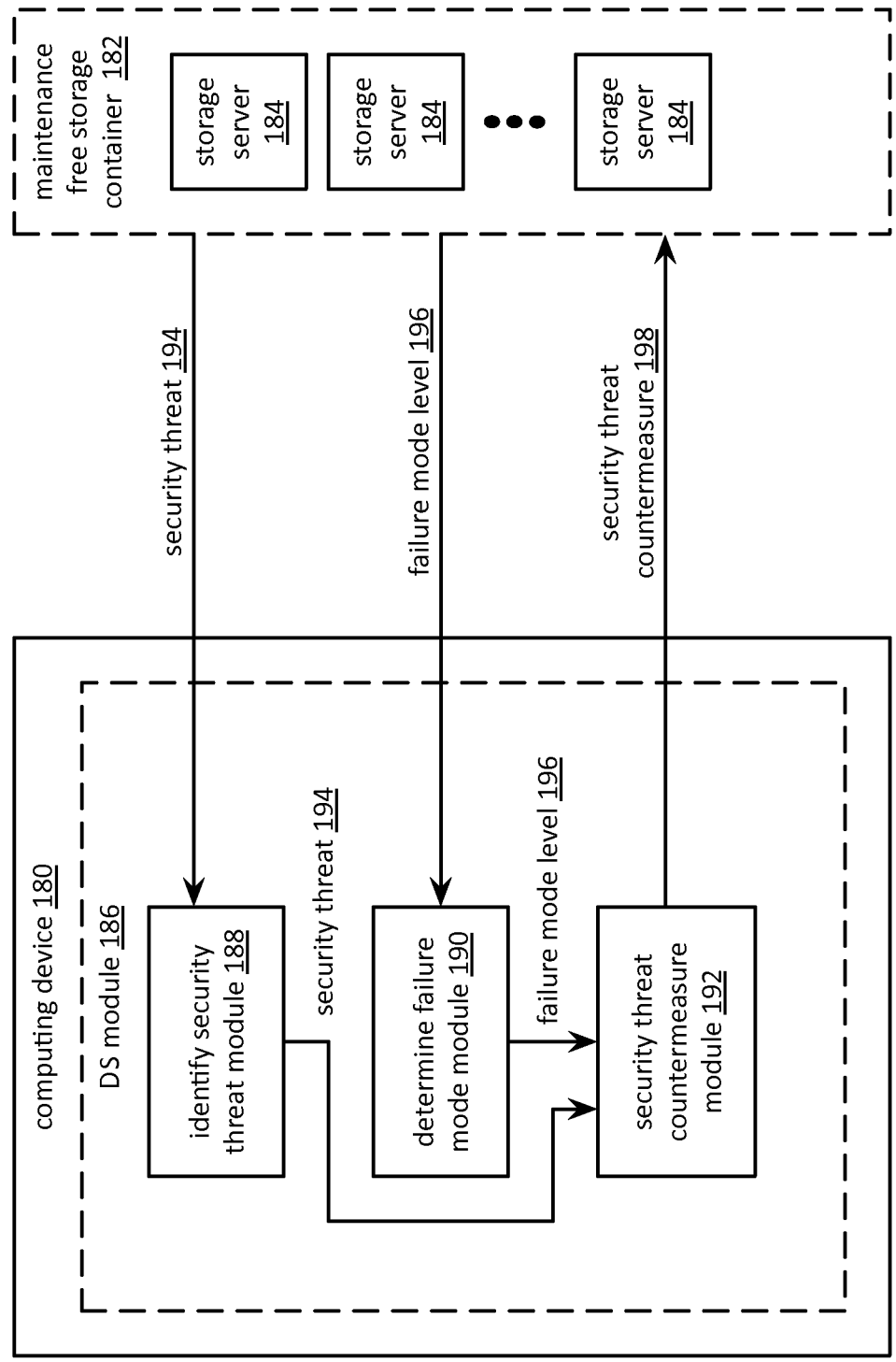
FIG. 11A is a schematic block diagram of another embodiment of a computing system in accordance with the present invention.

FIG. 11A is a schematic block diagram of another embodiment of a computing system that includes a computing device 180 and a maintenance free storage container 182. The maintenance free storage container 182 includes a plurality of storage servers 184. Each storage server 184 may include at least one of a memory device, a plurality of memory devices, and a dispersed storage (DS) unit. The computing device 180 may be implemented as at least one of a site controller, a container controller, a user device, a DS processing unit, a DS unit, a DS managing unit, and any other computing device operable to couple with the maintenance free storage container 182. The computing device 180 includes a DS module 186. The DS module 186 includes an identify security threat module 188, determine failure mode module 190, and a security threat countermeasure module 192.

The identify security threat module 188 identifies a security threat 194 for the maintenance free storage container 182, wherein the maintenance free storage container 182 allows for multiple storage servers 184 of a plurality of storage servers 184 to be in a failure mode without replacement. The security threat includes at least one of a physical security threat type (e.g., breech of the maintenance free storage container 182) and a data access security threat type (e.g., improper access of data stored in the maintenance free storage container 182). The identifying may be based on one or more of an error message, an intrusion detection message, an alarm indicator, a cyber threat indicator, a wireless receiver signal, a temperature change profile, a radiological detector output, a biological detector output, and a chemical output detector.

The determine failure mode module 190 determines a failure mode level 196 that is indicative of whether one or more of the multiple storage servers 184 are in the failure mode. The determine failure mode module 190 functions to determine the failure mode level 196 of the maintenance free storage container 182 in a variety of ways. In a first way, the determine failure mode module 190 determines that one or more storage locations within a first storage server 184 of the plurality of storage servers 184 has failed. In a second way, the determine failure mode module 190 determines that a second storage server 184 of the plurality of storage servers 184 has failed. In a third way, the determine failure mode module 190 determines that a third storage server 184 of the plurality of storage servers 184 is operating at less than a desired storage level but greater than a storage failure level. In a fourth way, the determine failure mode module 190 identifies one or more failure impacted storage vaults associated with at least one of the first storage server 184, the second storage server 184, and the third storage server 184.

The security threat countermeasure module 192 selects a security threat countermeasure 198 based on the security threat 194 and the failure mode level 196 and implements the security threat countermeasure 198. For example, the security threat countermeasure module 192 selects deactivating access to high-priority encoded data slices when a type of security threat detected is an intrusion detection. As another example, the security threat countermeasure module 192 selects migrating slices from storage servers 184 of the maintenance free storage container 182 to storage servers of another maintenance free storage container when the security threat 194 includes a flash fire detection. As yet another example, the security threat countermeasure module 192 selects deleting slices from storage servers 184 of the maintenance free storage container 182 when the security threat includes an unauthorized open container hatch.

The security threat countermeasure module 192 further functions to select one or more security threat countermeasures to include deleting a selected number of encoded data slices for one or more sets of encoded data slices of a plurality of sets of encoded data slices corresponding to a storage vault in accordance with the failure mode level 196 of the maintenance free storage container 182 and the one or more failure impacted storage vaults. For example, the selected number of encoded data slices includes a pillar width number minus a read threshold number. The deleting may include identifying sensitive encoded data slices (e.g., slices that are most undesirable for attack). The deleting may further include identifying sensitive encryption keys associated with storage of encoded data slices in the maintenance free storage container 182.

The identify security threat module 188 further functions to indicate a physical security threat type when detecting a physical anomaly condition of the maintenance free storage container 182. The physical anomaly condition includes a variety of conditions including at least one of an unauthorized open access door alarm, a pressure change alarm, an ambient light change alarm, localized wireless energy alarm, an extreme temperature alarm, a smoke alarm, a radiological detector alarm, a biological detector alarm, an atmospheric detector alarm, and a chemical detector alarm. The security threat countermeasure module 192 further functions to select a physical security threat type countermeasure. The selecting includes at least one of a countermeasure list lookup based on the physical security threat type, performing a test to acquire further threat type information, receiving a user input, and estimating a level of favorability of impact of a countermeasure.

The physical security threat type countermeasure includes one or more of a variety of countermeasures. A first countermeasure includes migrating at least some data stored in the plurality of storage servers to another maintenance free storage container. For example, the security threat countermeasure module 192 migrates encoded data slices from the plurality of storage servers to another maintenance free storage container such that less than a decode threshold number of encoded data slices per data segment remain in the plurality of storage servers. A second countermeasure includes deleting one or more encryption keys utilized to access the data. A third countermeasure includes deleting at least some of the data stored in the plurality of storage servers. For example, the security threat countermeasure module 192 deletes encoded data slices that expose data. As another example, the security threat countermeasure module 192 deletes encoded data slices from the plurality of stored servers such that at least a decode threshold number of encoded data slices per data segment remain in the plurality of stored servers. A fourth countermeasure includes deactivating one or more storage servers of the plurality of storage servers.

The identify security threat module 188 module further functions to indicate a data access security threat type when detecting unauthorized access of data from one or more storage servers 184 of the plurality of storage servers 184. The detecting includes at least one of receiving a slice access request from an unauthorized requester, detecting an unfavorable data access pattern, receiving a cyber threat indicator, and detecting a monitoring device. The security threat countermeasure module 192 further functions to select a data access security threat type countermeasure. The selecting includes at least one of a countermeasure list lookup based on the data access security threat type, performing a test to acquire further threat type information, receiving a user input, and estimating a level of favorability of impact of a countermeasure.

The data access security threat type countermeasure includes one or more of a variety of countermeasures. A first countermeasure includes randomly accessing the data to produce a pseudorandom electromagnetic pattern. A second countermeasure includes outputting random data in response to a data request from a requesting entity associated with a threat pattern. A third countermeasure includes migrating at least some data stored in the plurality of storage servers 184 to another maintenance free storage container. A fourth countermeasure includes deleting one or more encryption keys utilized to access the data. A fifth countermeasure includes deleting at least some of the data stored in the plurality of storage servers 184. A sixth countermeasure includes deactivating one or more storage servers 184 of the plurality of storage servers 184.

Figure 11B:
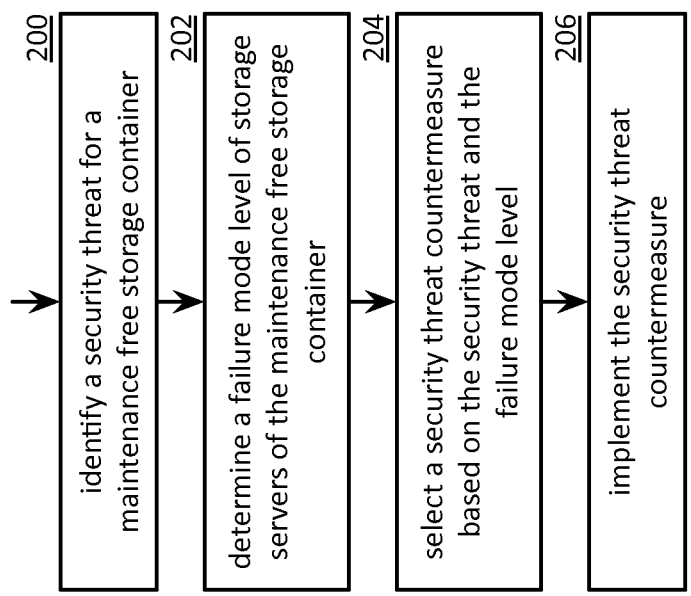
FIG. 11B is a flowchart illustrating an example of invoking security measures in accordance with the present invention.

FIG. 11B is a flowchart illustrating an example of invoking security measures. The method begins at step 200 where a processing module (e.g., of a site controller, a container controller, a user device, a dispersed storage (DS) processing unit, a DS unit, a DS managing unit) identifies a security threat for a maintenance free storage container, wherein the maintenance free storage container allows for multiple storage servers of a plurality of storage servers to be in a failure mode without replacement. The processing module indicates a physical security threat type when detecting a physical anomaly condition of the maintenance free storage container. The processing module indicates a data access security threat type when detecting unauthorized access of data from one or more storage servers of the plurality of storage servers.

The method continues at step 202 where the processing module determines a failure mode level that is indicative of whether one or more of the multiple storage servers are in the failure mode. The determining the failure mode level of the maintenance free storage container may be accomplished in a variety of ways. For example, the processing module determines that one or more storage locations within a first storage server of the plurality of storage servers has failed. As another example, the processing module determines that a second storage server of the plurality of storage servers has failed. As yet another example, the processing module determines that a third storage server of the plurality of storage servers is operating at less than a desired storage level but greater than a storage failure level. As a still further example, the processing module identifies one or more failure impacted storage vaults associated with at least one of the first storage server, the second storage server, and the third storage server.

The method continues at step 204 where the processing module selects a security threat countermeasure based on the security threat and the failure mode level. The method continues at step 206 where the processing module implements the security threat countermeasure. The selecting the one or more security threat countermeasures includes deleting a selected number of encoded data slices for one or more sets of encoded data slices of a plurality of sets of encoded data slices corresponding to a storage vault in accordance with the failure mode level of the maintenance free storage container and the one or more failure impacted storage vaults. The processing module selects a physical security threat type countermeasure when detecting a physical anomaly condition of the maintenance free storage container. The processing module selects a data access security threat type countermeasure when detecting unauthorized access of data from one or more storage servers of the plurality of storage servers.

The physical security threat type countermeasure includes a variety of countermeasures. For example, the processing module migrates at least some data stored in the plurality of storage servers to another maintenance free storage container. As another example, the processing module deletes one or more encryption keys utilized to access the data. As yet another example, the processing module deletes at least some of the data stored in the plurality of storage servers. As a still further example, the processing module deactivates one or more storage servers of the plurality of storage servers.

The data access security threat type countermeasure includes a variety of countermeasures. For example, the processing module randomly accesses the data to produce a pseudorandom electromagnetic pattern. As another example, the processing module outputs random data in response to a data request from a requesting entity associated with a threat pattern. As yet another example, the processing module migrates at least some data stored in the plurality of storage servers to another maintenance free storage container. As a still further example, the processing module deletes one or more encryption keys utilized to access the data and/or at least some of the data stored in the plurality of storage servers. As yet a still further example, the processing module deactivates one or more storage servers of the plurality of storage servers.

Figure 12A:
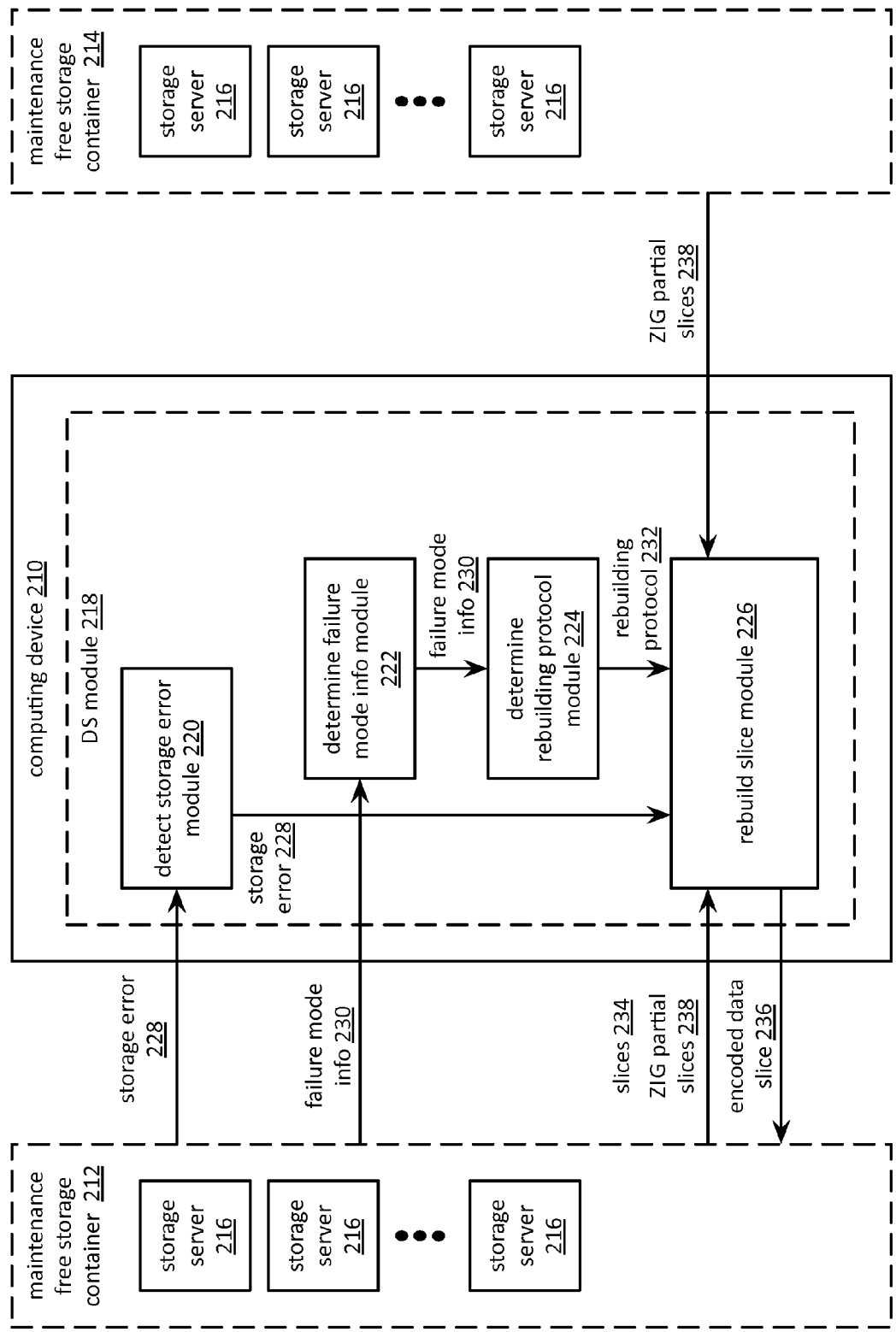
FIG. 12A is a schematic block diagram of another embodiment of a computing system in accordance with the present invention.

FIG. 12A is a schematic block diagram of another embodiment of a computing system that includes a computing device 210 and at least two maintenance free storage containers 212-214. Each maintenance free storage container includes a plurality of storage servers 216. Each storage server 216 may include at least one of a memory device, a plurality of memory devices, and a dispersed storage (DS) unit. The computing device 210 may be implemented as at least one of a site controller, a container controller, a user device, a DS processing unit, a DS unit, a DS managing unit, and any other computing device operable to couple with the maintenance free storage containers 212-214. The computing device 210 includes a DS module 218. The DS module 218 includes a detect storage module 220, a determine failure mode information module 222, a determine rebuilding the protocol module 224, and a rebuild sliced module 226.

The maintenance free storage containers 212-214 allow for multiple storage servers 216 of the plurality of storage servers 216 to be in a failure mode without replacement. Data is encoded using a dispersed storage error coding function to produce a set of encoded data slices, which includes an encoded data slice 236. At least some encoded data slices of the set of encoded data slices are stored in other storage servers 216 of the plurality of storage servers 216. The computing device 210 is operable to rebuild the encoded data slice 236 for maintenance free storage container 212. The detect storage error module 220 detects a storage error 228 of the encoded data slice 236 associated with a storage server 216 of a plurality of storage servers 216 within maintenance free storage container 212.

The detect storage error module 220 functions to detect the storage error 228 of the encoded data slice 236 in a variety of ways. In a first way, the detect storage module 220 indicates the storage error 228 when a list response from the storage server compares unfavorably to at least another list response from the other storage servers. As such, the list response exposes one or more of a missing slice and a missing slice revision. The detecting includes issuing a list and/or list digest request and receiving a list and/or list digest response. In a second way, the detect storage module 220 indicates the storage error 228 when a calculated slice integrity value compares unfavorably to a retrieved slice integrity value corresponding to the encoded data slice (e.g., hash mismatch). In a third way, the detect storage module 220 indicates the storage error 228 when determining that the storage server is in the failure mode (e.g., storage error when the storage server has failed). In a fourth way, the detect storage module 220 receives a storage error message. In a fifth way, the detect storage module 220 receives a rebuilding request, wherein the rebuilding request includes a slice name associated with the encoded data slice.

The determine failure mode information module 222 determines failure mode information 230 for the storage server 216 and the other storage servers 216. The determine failure mode information module 222 functions to determine the failure mode information 230 by at least one of determining that one or more storage locations within a first storage server 216 of the storage server 216 and of the other storage servers 216 has failed, determining that a second storage server 216 of the storage server 216 and of the other storage servers 216 has failed, and determining that a third storage server 216 of the storage server 216 and of the other storage servers 216 is operating at less than a desired storage level but greater than a storage failure level.

The determine rebuilding protocol module 224 determines a rebuilding protocol 232 for the encoded data slice 236 based on the failure mode information 230 and whether at least a decode threshold of the other storage servers 216 are available. The determine rebuilding protocol module 224 functions to determine the rebuilding protocol 232 by determining whether quantity of the other storage servers 216 is at least equal to a decode threshold number and when the quantity of the other storage servers 216 is less than the decode threshold number, identifying the ZIG protocol as the rebuilding protocol 232.

The rebuild slice module 226, when the determined rebuilding protocol is a zero information gain (ZIG) protocol, identifies a decode threshold number of storage servers 216 from the other storage servers 216 of the maintenance free storage container 212 and from storage servers 216 of another maintenance free storage container 214 (e.g., at least some of the set of encoded data slices were previously stored at another maintenance free storage container). Next, the rebuild sliced module 226 retrieves zero information gain (ZIG) partial encoded data slices 238 from the decode threshold number of storage servers 216 and decodes the ZIG partial encoded data slices 238 utilizing a ZIG dispersed storage error coding function to reproduce the encoded data slice 236.

The rebuild slice module 226 functions to retrieve the decode threshold number of zero information gain (ZIG) partial encoded data slices 238 corresponding to the encoded data slice 236 by generating a decode threshold number of ZIG partial encoded data slice requests based on identity of the encoded data slice 236 and pillar numbers associated with the decode threshold number of storage servers 216. The ZIG partial encoded data slice request may include one or more of a slice name of the encoded data slice 236 to be rebuilt, a pillar number associated with the encoded data slice 236, pillar numbers associated with participant storage servers 216, an encoding matrix of the dispersed storage error coding function, and an inverted square matrix corresponding to ZIG rebuilding of the encoded data slice 236. Next, the rebuild slice module 226 outputs the decode threshold number of ZIG partial encoded data slice requests to the decode threshold number of storage servers 216. Next, the rebuild slice module 226 receives the decode threshold number of ZIG partial encoded data slices 238 from the decode threshold number of storage servers 216. The rebuild slice module 226 functions to decode the decode threshold number of ZIG partial encoded data slices 238 by exclusive ORing the decode threshold number of ZIG partial encoded data slices 238 to reproduce the encoded data slice 236.

A storage server 216 of the decode threshold number of storage servers 216 is operable to generate a ZIG partial encoded data slice 238 by obtaining an encoding matrix utilized to generate the encoded data slice 236 (e.g., extracted from the ZIG partial encoded data slice request, retrieved from a memory), reducing the encoding matrix to produce a square matrix that exclusively includes rows identified in the partial rebuilding request (e.g., pillars associated with participating storage servers 216 of the decode threshold number of storage servers 216), inverting the square matrix to produce an inverted matrix (e.g. alternatively, may extract the inverted matrix from the ZIG partial encoded data slice request), matrix multiplying the inverted matrix by a corresponding encoded data slice retrieved from memory of the storage server 216 to produce a vector, and matrix multiplying the vector by a row of the encoding matrix corresponding to the encoded data slice 236 to be rebuilt (e.g. alternatively, may extract the row from the ZIG partial encoded data slice request), to produce the ZIG partial encoded data slice 238.

The rebuild slice module 226, when the determined rebuilding protocol 232 is a data-based rebuild protocol (e.g., when the quantity of the other storage servers 216 is at least the decode threshold number), retrieves a decode threshold number of encoded data slices 234 of the set of encoded data slices from the other storage servers 216 and decodes the decode threshold number of encoded data slices 234 utilizing the dispersed storage error coding function to reproduce the data. Next, the rebuild slice module 226 encodes the data utilizing the dispersed storage error coding function to reproduce the encoded data slice 236.

Figure 12B:
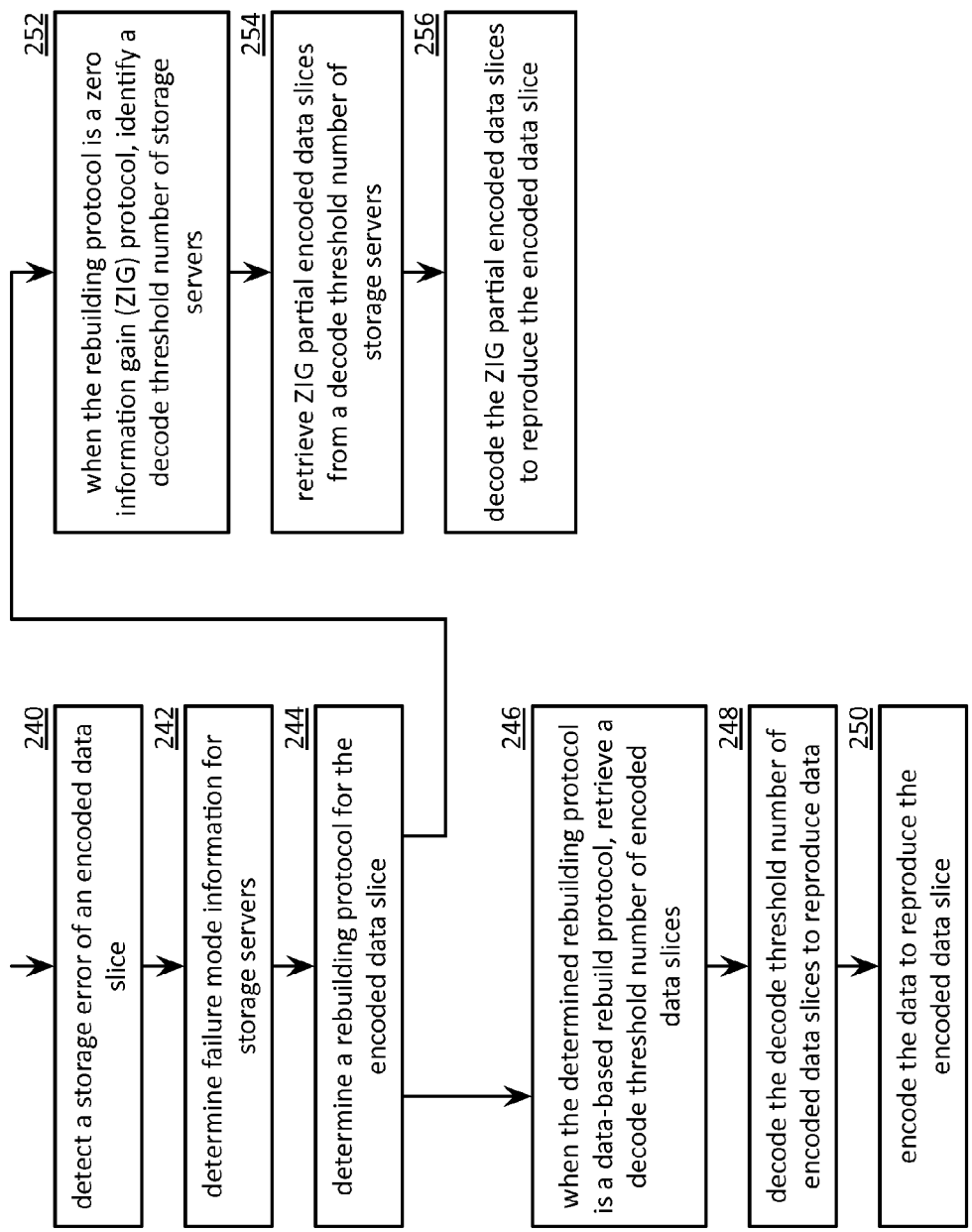
FIG. 12B is a flowchart illustrating an example of rebuilding an encoded data slice in accordance with the present invention.

FIG. 12B is a flowchart illustrating an example of rebuilding an encoded data slice. The method begins at step 240 where a processing module (e.g., of a site controller, a container controller, a user device, a dispersed storage (DS) processing unit, a DS unit, a DS managing unit) detects a storage error of an encoded data slice associated with a storage server of a plurality of storage servers within a maintenance free storage container. The maintenance free storage container allows for multiple storage servers of the plurality of storage servers to be in a failure mode without replacement. Data is encoded using a dispersed storage error coding function to produce a set of encoded data slices, which includes the encoded data slice, and wherein at least some encoded data slices of the set of encoded data slices are stored in other storage servers of the plurality of storage servers.

The detecting the storage error of the encoded data slice includes at least one of a variety of ways to detect the storage error. The variety of ways to detect the storage error includes indicating the storage error when a list response from the storage server compares unfavorably to at least another list response from the other storage servers, indicating the slice error when a calculated slice integrity value compares unfavorably to a retrieved slice integrity value corresponding to the encoded data slice, indicating the slice error when determining that the storage server is in the failure mode, receiving a slice error message, and receiving a rebuilding request, wherein the rebuilding request includes a slice name associated with the encoded data slice.

The method continues at step 242 where the processing module determines failure mode information for the storage server and the other storage servers. The determining the failure mode information may be accomplished in a variety of ways. In a first way, the processing module determines that one or more storage locations within a first storage server of the storage server and of the other storage servers has failed. In a second way, the processing module determines that a second storage server of the storage server and of the other storage servers has failed. In a third way, the processing module determines that a third storage server of the storage server and of the other storage servers is operating at less than a desired storage level but greater than a storage failure level.

The method continues at step 244 where the processing module determines a rebuilding protocol for the encoded data slice based on the failure mode information and whether at least a decode threshold of the other storage servers are available. The rebuilding protocol includes at least one of a data-based rebuild protocol (e.g., involving retrieving encoded data slices associated with the encoded data slice of the storage error) and a zero information gain (ZIG) protocol (e.g., involving obtaining ZIG partial encoded data slices associated with the encoded data slice of the storage error). The determining the rebuilding protocol includes determining whether quantity of the other storage servers is at least equal to a decode threshold number and when the quantity of the other storage servers is less than the decode threshold number, identifying the ZIG protocol.

When the determined rebuilding protocol is a data-based rebuild protocol, the method continues at step 246 where the processing module retrieves a decode threshold number of encoded data slices of the set of encoded data slices from the other storage servers. The retrieving includes generating a decode threshold number of encoded data slice requests and sending the decode threshold number of encoded data slice requests to the other storage servers. The method continues at step 248 where the processing module decodes the decode threshold number of encoded data slices utilizing the dispersed storage error coding function to reproduce the data. The method continues at step 250 where the processing module encodes the data utilizing the dispersed storage error coding function to reproduce the encoded data slice. In addition, the processing module may store the reproduce the encoded data slice in the storage server.

When the determined rebuilding protocol is the ZIG protocol, the method continues at step 252 where the processing module identifies a decode threshold number of storage servers from the other storage servers of the maintenance free storage container and from storage servers of another maintenance free storage container. The method continues at step 254 where the processing module retrieves ZIG partial encoded data slices from the decode threshold number of storage servers. The retrieving the decode threshold number of ZIG partial encoded data slices corresponding to the encoded data slice includes generating a decode threshold number of ZIG partial encoded data slice requests based on identity of the encoded data slice and pillar numbers associated with the decode threshold number of storage servers. Next, the processing module outputs the decode threshold number of ZIG partial encoded data slice requests to the decode threshold number of storage servers. Next, the processing module receives the decode threshold number of ZIG partial encoded data slices from the decode threshold number of storage servers.

The method continues at step 256 where the processing module decodes the ZIG partial encoded data slices utilizing a ZIG dispersed storage error coding function to reproduce the encoded data slice. The decoding the decode threshold number of ZIG partial encoded data slices includes exclusive ORing the decode threshold number of ZIG partial encoded data slices to reproduce the encoded data slice.

Figure 13B:
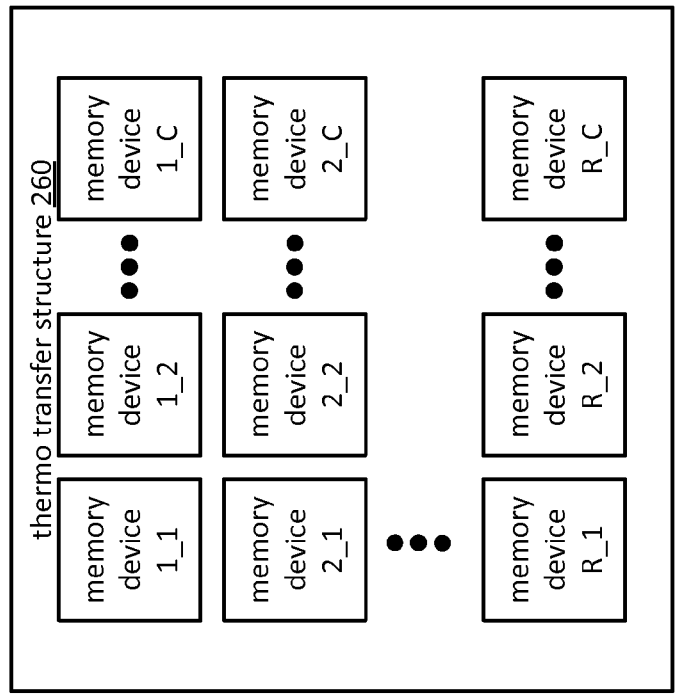
FIG. 13B is a diagram illustrating another example of a storage container memory structure in accordance with the present invention.
Figure 13C:
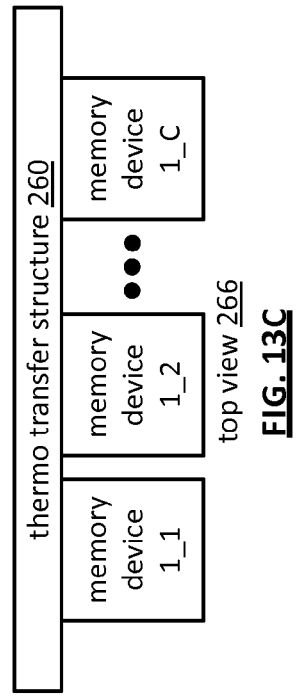
FIG. 13C is a diagram illustrating another example of a storage container memory structure in accordance with the present invention.
Figure 13A:
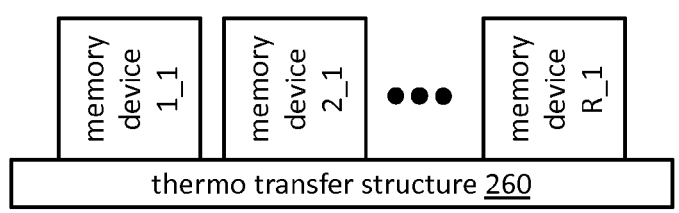
FIG. 13A is a diagram illustrating an example of a storage container memory structure in accordance with the present invention.

FIG. 13A is a diagram illustrating an example of a storage container memory structure from a side view 262. The structure includes a thermo transfer structure 260 and a plurality of memory devices 1_1, 2_1, through R_1 associated with a column of a matrix of memory devices. Each memory device of the plurality of memory devices may include one or more of a computing core, a power interface, a communication interface and a memory. The memory may be implemented utilizing at least one of a solid-state memory, a magnetic disk drive, and an optical disk drive. The thermo transfer structure 260 provides structural support to mounting the plurality of memory devices, provides wicking of heat from the plurality of memory devices, and may be implemented utilizing at least one of a metal and a composite material.

Each memory device of the plurality of memory devices is mounted to the thermo transfer structure 260 such that heat generated by the memory device may be conducted to the thermo transfer structure 260. One or more memory devices of the plurality of memory devices may be associated with a dispersed storage (DS) unit of a dispersed storage network (DSN) memory.

FIG. 13B is a diagram illustrating another example of a storage container memory structure from a front view 264. The structure includes a thermo transfer structure 260 and a plurality of memory devices organized in a matrix of memory devices that includes C columns and R rows. The matrix of memory devices may include hundreds or even thousands of memory devices. As such, a significant amount of heat may be generated by the plurality of memory devices and transferred to the thermo transfer structure 260.

FIG. 13C is a diagram illustrating another example of a storage container memory structure from a top view 266. The structure includes a thermal transfer structure 260 and a plurality of memory devices 1_1, 1_2, through 1_C associated with a row of a matrix of memory devices.

Figure 14:
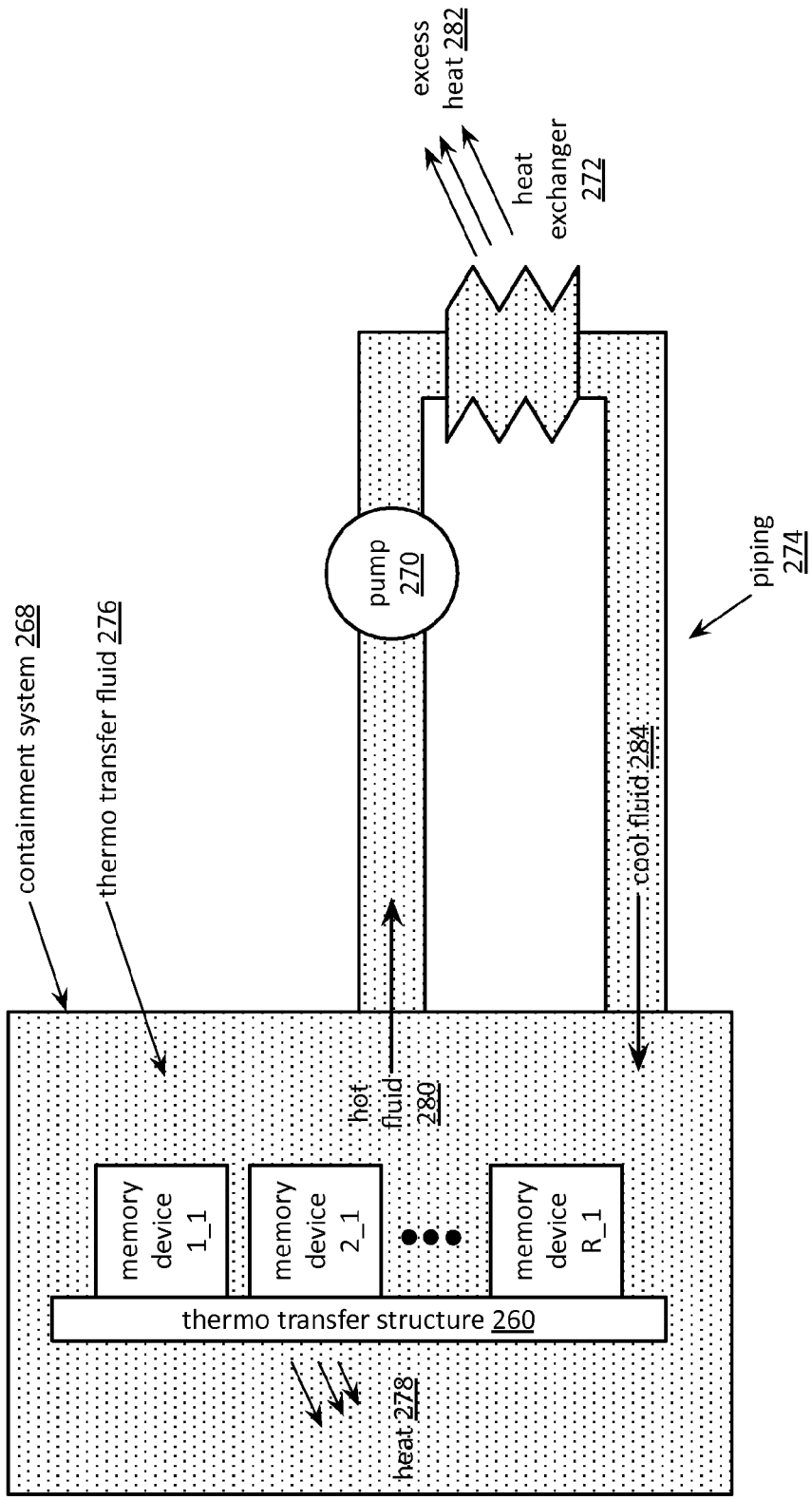
FIG. 14 is a diagram illustrating an example of a storage container memory system in accordance with the present invention.

FIG. 14 is a diagram illustrating an example of a storage container memory system that includes a containment system 268, piping 274, a pump 270, and a heat exchanger 272. The containment system 268 contains a maintenance free storage container memory structure within a pool of thermo transfer fluid 276. The maintenance free storage container memory structure includes a thermo transfer structure 260 and a plurality of memory devices including memory devices 1_1, 2_1, through R_1, associated with a column of memory devices, wherein the plurality of memory devices are affixed to the thermo transfer structure 260. The thermo transfer fluid includes a heat transfer in material such as at least one of a fluid (e.g., water), a slurry, a gas, and a solid.

The thermo transfer structure 260 absorbs heat from the plurality of memory devices and transfers at least some of the heat 278 to the thermo transfer fluid 276. The pump 270 pulls at least some of the thermo transfer fluid 276 as hot fluid 280 from the containment system 268 into the piping 274. The pump 270 moves the hot fluid 280 to the heat exchanger 272 where at least some of the heat is emitted as excess heat 282. The hot fluid 280 exits the heat exchanger 272 into the piping 274 as cool fluid 284 and is pushed back into the containment system 268 by the pump 270. The cycle continuously repeats to maintain a favorable average temperature of the thermo transfer fluid 276 within the containment system 268 providing thermal stability for the plurality of memory devices.

The pump 270 may be activated when a temperature of the thermo transfer fluid 276 is above a high temperature threshold and deactivated when the temperature of the thermal transfer fluid 276 is below a low temperature threshold. Alternatively, the pump may be activated when a storage activity level of the plurality of memory devices is above a high storage activity threshold and deactivated when the storage activity level of the plurality of memory devices is below a low storage activity threshold.

Figure 15:
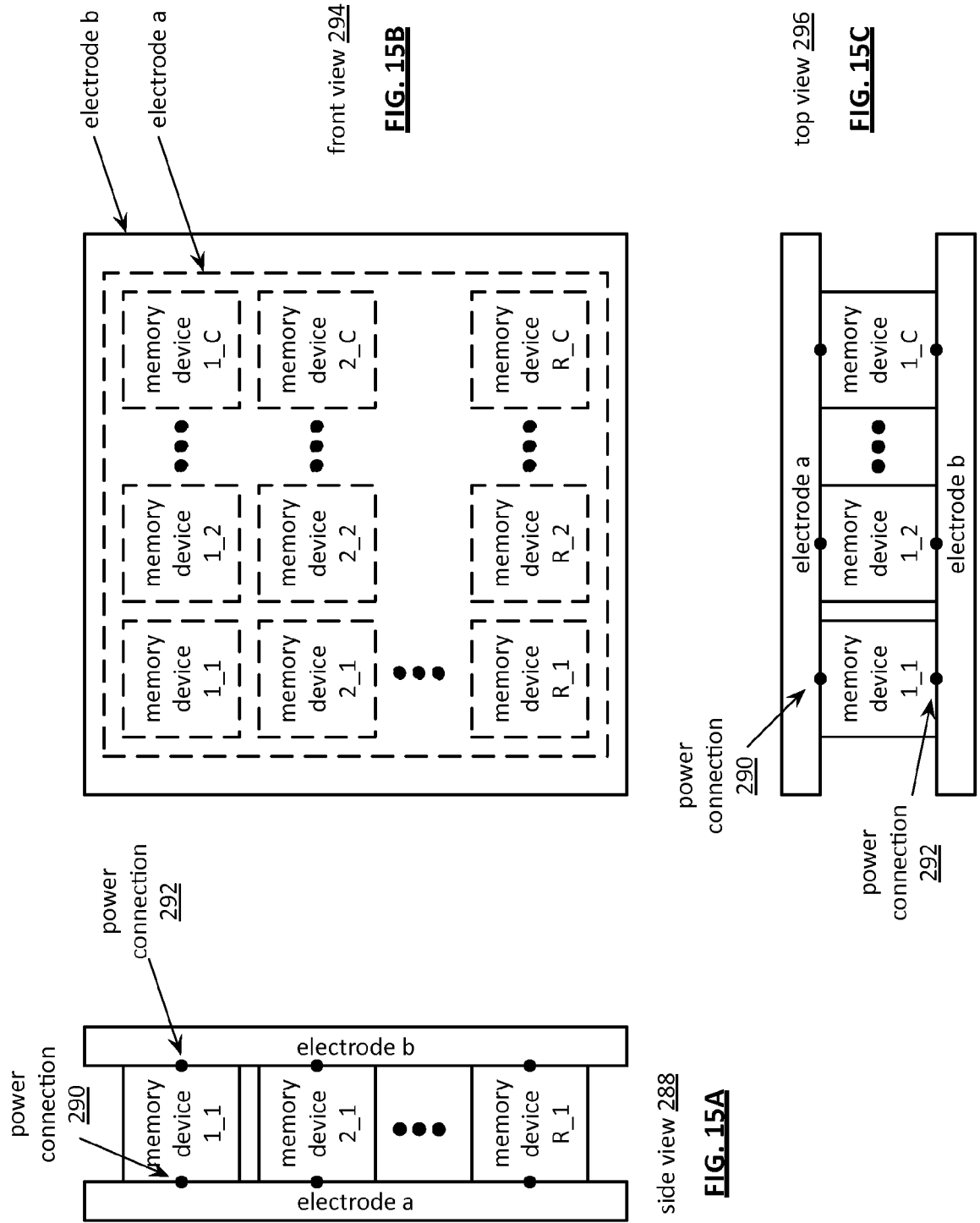
FIG. 15A is a diagram illustrating another example of a storage container memory structure in accordance with the present invention.
FIG. 15B is a diagram illustrating another example of a storage container memory structure in accordance with the present invention.
FIG. 15C is a diagram illustrating another example of a storage container memory structure in accordance with the present invention.

FIG. 15A is a diagram illustrating another example of a storage container memory structure from a side view 288. The structure includes an electrode a, an electrode b, and a plurality of memory devices 1_1, 2_1, through R_1 associated with a column of a matrix of memory devices. One or more memory devices of the plurality of memory devices may be associated with a dispersed storage (DS) unit of a dispersed storage network (DSN) memory. Each memory device of the plurality of memory devices may include one or more of a computing core, one or more power connections 290-292, a communication interface, and a memory, wherein the memory may be implemented utilizing at least one of a solid-state memory, a magnetic disk drive, and an optical disk drive. Each power connection of the one or more power connections 290-292 includes at least one of a power connector and a pass-through opening for a power wire. For example, power is provided to a memory device via a power connection 290 associated with electrode a and another power connection 292 associated with electrode b. The electrodes a-b provides structural support to mount the plurality of memory devices, provides power to the plurality of memory devices via the power connections 290-292, creates stored battery power by interacting with an electrolyte when receiving external power, and may be implemented utilizing at least one of a metal associated with batteries (e.g., lead).

FIG. 15B is a diagram illustrating another example of a storage container memory structure from a front view 294. The structure includes an electrode a, and electrode b, and a plurality of memory devices organized in a matrix of memory devices that includes C columns and R rows. The matrix of memory devices may include hundreds or even thousands of memory devices. As such, a significant amount of power may be required by the plurality of memory devices.

FIG. 15C is a diagram illustrating another example of a storage container memory structure from a top view 296. The structure includes an electrode a, and electrode b, and a plurality of memory devices 1_1, 1_2, through 1_C associated with a row of a matrix of memory devices. Each memory device of the plurality of memory devices includes a power connection 290 to electrode a and a second power connection 292 to electrode b to receive operational power.

Figure 16:
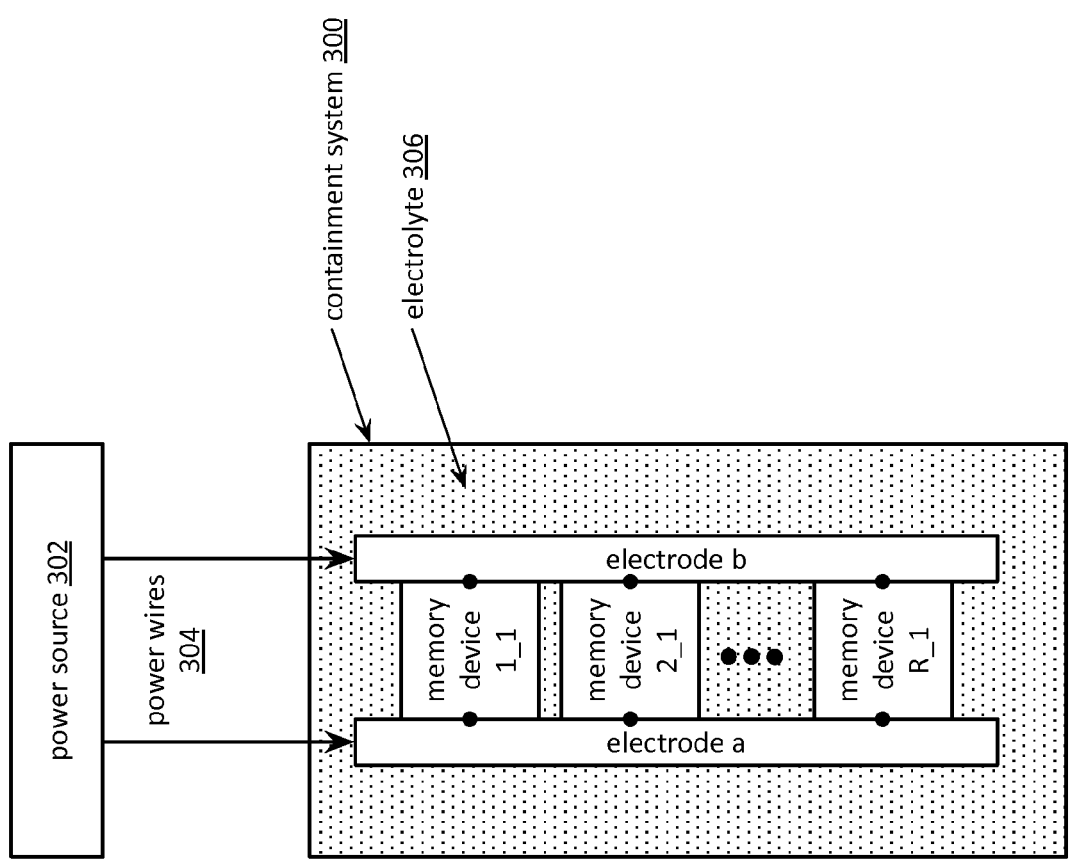
FIG. 16 is a diagram illustrating another example of a storage container memory system in accordance with the present invention.

FIG. 16 is a diagram illustrating another example of a storage container memory system that includes a containment system 300, a power source 302, and power wires 304 coupling the power source 302 to the containment system 300. The containment system 300 contains a storage container memory structure and an electrolyte 306 and may be implemented utilizing a suitable material such as at least one of metal, glass, and a composite material. The storage container memory structure includes at least a plurality of memory devices 1_1, 2_1, through R_1, associated with a column of memory devices, affixed between an electrode a and an electrode b. The electrolyte 306 includes a chemical agent (e.g., acid) to form a battery cell in conjunction with electrodes a-b. In addition, the electrolyte 306 may wick at least some excess heat from the plurality of memory devices by at least one of directly from the plurality of memory devices and via the electrodes a-b. Multiple storage container memory structures may be implemented within the containment system forming a serial connection of multiple battery cells.

The power source 302 provides power via the power wires to electrodes a-b. A charging power portion of the power interacts with electrodes a-b and the electrolyte 306 to charge the battery cell. A memory device power portion of the power supplies operational power to the plurality of memory devices. The electrodes a-b and the electrolyte interact to form a discharging battery cell when no power is provided by the power source 302 and the battery cell is charged. The battery cell provides operational power to the plurality of memory devices when the battery cell is discharging. The amount of power provided by the power source may be raised when the battery cell is discharged and a storage activity level of the plurality of memory devices is above a high activity threshold. The amount of power provided by the power source 302 may be lowered when the battery cell is charged and storage activity level of the plurality of memory devices is below a low activity threshold. The power source 302 may be temporarily turned off to allow the battery cell to discharge powering the plurality of memory devices when activating the power source is unfavorable. For example, activating the power source may be unfavorable based on a midday high cost of purchasing external power, a reliability level of external power, and/or a poor quality of external power.

Figure 17:
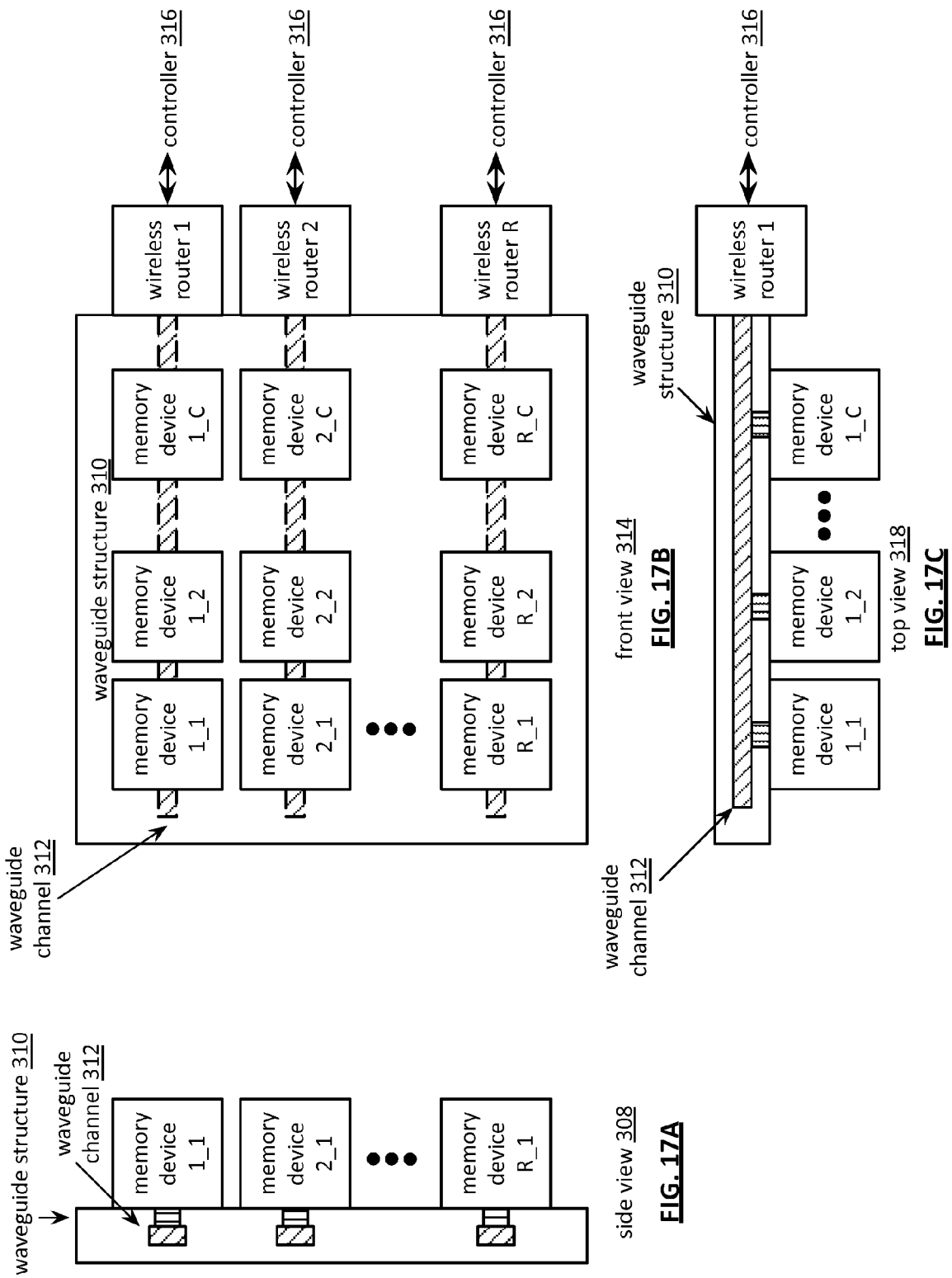
FIG. 17A is a diagram illustrating another example of a storage container memory structure in accordance with the present invention.
FIG. 17B is a diagram illustrating another example of a storage container memory structure in accordance with the present invention.
FIG. 17C is a diagram illustrating another example of a storage container memory structure in accordance with the present invention.

FIG. 17A is a diagram illustrating another example of a storage container memory structure from a side view 308. The structure includes a waveguide structure 310 and a plurality of memory devices 1_1, 2_1, through R_1 associated with a column of a matrix of memory devices. One or more memory devices of the plurality of memory devices may be associated with a dispersed storage (DS) unit of a dispersed storage network (DSN) memory. Each memory device of the plurality of memory devices may include one or more of a computing core, a power interface, a wireless communication interface, and a memory, wherein the memory may be implemented utilizing at least one of a solid-state memory, a magnetic disk drive, and an optical disk drive. The waveguide structure 300 and provides one or more of structural support to mount the plurality of memory devices, wicking of heat from the plurality of memory devices, a wireless communication path, and may be implemented to form one or more waveguide channels 312 (e.g., free space tunnels within the waveguide structure) utilizing at least one of a metal and a composite material. The waveguide channel 312 provides an enclosed path for wireless communications between two or more elements of the waveguide structure 310 utilizing contained wireless signals.

FIG. 17B is a diagram illustrating another example of a storage container memory structure from a front view 314. The structure includes a waveguide structure 310, a plurality of wireless routers 1-R, and a plurality of memory devices organized in a matrix of memory devices that includes C columns and R rows. The waveguide structure 300 and includes a plurality of waveguide channels 312 to provide enclosed wireless communication paths between two or more elements mounted to the waveguide structure 310. The matrix of memory devices may include hundreds or even thousands of memory devices. As such, a significant amount of element to element communication may be required by the plurality of memory devices. At least one wireless router of the plurality of wireless routers 1-R is associated with each waveguide channel of the plurality of waveguide channels 312. Each wireless router provides communication between a controller 316 and a subset of memory devices of the plurality of memory devices. For example, wireless router 1 provides communication between the controller 316 and a subset of memory devices 1_1, 1_2, through 1_C associated with a first row of the matrix of memory devices.

Each memory device of the plurality of memory devices is mounted to the waveguide structure 310 such that an antenna of a wireless transceiver associated with the memory device is in close proximity to a corresponding waveguide channel 312 of the waveguide structure 310. For example, a horizontal waveguide channel 312 connects a subset of memory devices and a wireless router associated with a common row. The wireless router communicates contained wireless signal to each memory device of a subset of memory devices of the common row but not to other memory devices of the plurality of memory devices. As another example, a vertical waveguide channel 312 connects a plurality of memory devices associated with a common column to another wireless router, but not to other memory devices of the plurality of memory devices.

FIG. 17C is a diagram illustrating another example of a storage container memory structure from a top view 318. The structure includes a waveguide structure 310, a wireless router 1, and a plurality of memory devices 1_1, 1_2, through 1_C associated with a common row of a matrix of memory devices. Each memory device of the plurality of memory devices communicates with the wireless router 1 through a waveguide channel 312 of the waveguide structure 310 via contained wireless signals.

Figure 18:
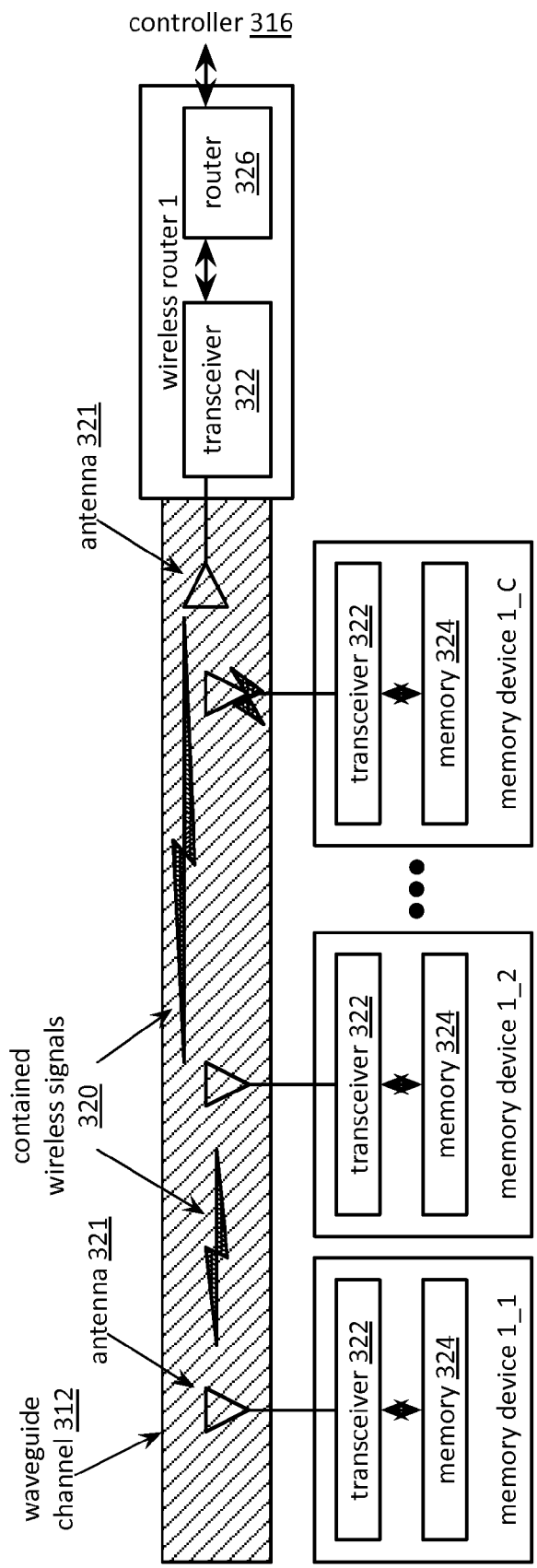
FIG. 18 is a diagram illustrating another example of a storage container memory system in accordance with the present invention.

FIG. 18 is a diagram illustrating another example of a storage container memory system that includes a plurality of memory devices 1_1, 1_2, through 1_C, a waveguide channel 312, and a wireless router 1. The wireless router includes a transceiver 322 and a router 326 and functions to convert data from a controller 316 into contained wireless signals 320 and converts contained wireless signals 320 into data to send to the controller 316.

The waveguide channel 312 provides an enclosed wireless communication space such that the contained wireless signals 320 propagate freely between elements associated with the waveguide channel 312 but not with other elements not associated with the waveguide channel 312. For example, the contained wireless signals 320 may operate at a frequency of 60 GHz and may be implemented in accordance with one or more industry standards associated with 60 GHz. Each memory device of the plurality of memory devices includes a transceiver 322 and a memory 324. The transceiver 322 functions to convert received contained wireless signals 320 into data for storage in the memory 324 and converts data retrieved from the memory 324 into contained wireless signals 320 for transmission to the wireless router 1.

Each transceiver 322 of the plurality of memory devices and the wireless router 1 is associated with an antenna 321, wherein the antenna 321 functions to transmit and receive the contained wireless signals 320 within the waveguide channel 312. In a first implementation, the antenna 321 is just outside of the waveguide channel 312 within each transceiver 322. In a second implication, the antenna 321 protrudes into the waveguide channel 312 from each transceiver 322.

Figure 19A:
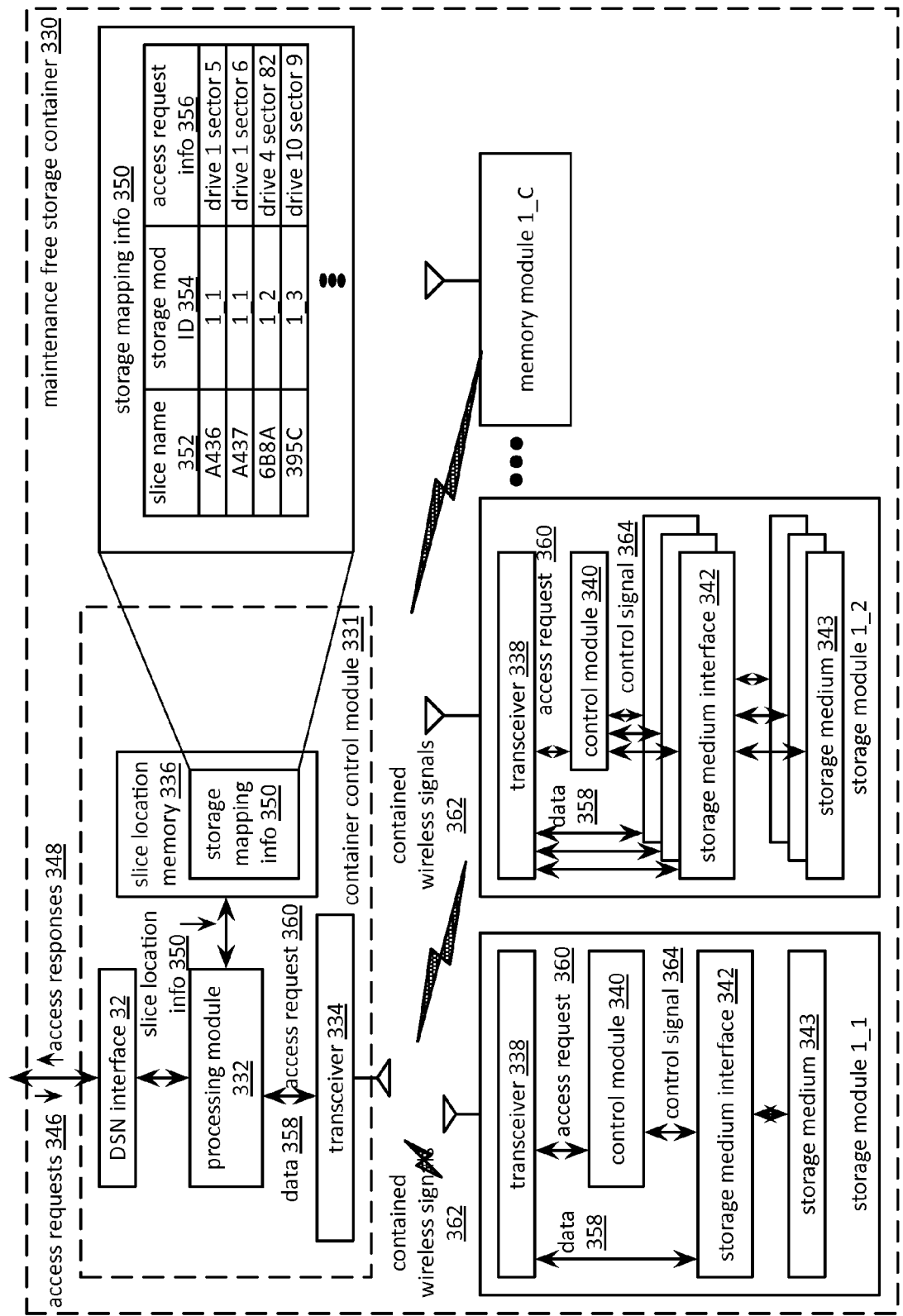
FIG. 19A is a schematic block diagram of an embodiment of a maintenance free storage container in accordance with the present invention.

FIG. 19A is a schematic block diagram of an embodiment of a maintenance free storage container 330 that includes a container control module 331 and a plurality of storage modules 1_1, 1_2, through 1_C. The maintenance-free storage container allows for multiple storage modules of a plurality of storage modules to be in a failure mode without replacement. The container control module 331 includes a dispersed storage network (DSN) interface 32, a processing module 332, a slice location memory 336, and a transceiver 334. The plurality of storage modules includes a sufficient number of storage modules to provide at least one peta-byte of storage. Each storage module of the plurality of storage modules includes a transceiver 338, a control module 340 (e.g., a hardware controller), one or more storage medium interfaces 342 and one or more storage mediums 343. Each storage medium 343 may be implemented utilizing at least one of magnetic disk drive technology, tape technology, and optical disk drive technology.

The processing module 332 of the container control module 331 is operable to determine failure mode information for the plurality of storage modules and manage storage mapping information 350 of data content within the plurality of storage modules based on the failure mode information. The slice location memory 336 is operable to store the storage mapping information 350. The slice mapping information 350 includes one or more entries by slice name, wherein each entry includes a slice name of a slice name field 352, a storage module identifier (ID) of a storage module ID field 354, and access request information of an access request information field 356 (e.g., position information). For example, an entry indicates that an encoded data slice associated with slice name A436 is stored at storage module 1_2, drive 1, at sector 5. The slice location memory 336 may be implemented as one or more of a local memory associated with the container control module 331 one or more of the storage modules 1_1 through 1_C.

The container control module 331 may be associated with a dispersed storage (DS) unit or a DSN. When the container control module 331 is associated with a DS unit, the container control module 331 manages the storage mapping information of encoded data slices having common pillar references within their respective slices names within the plurality of storage modules based on the failure mode information, wherein digital information is segmented into digital information segments and wherein a digital information segment of the digital information segments is encoded using a dispersed storage error coding function to produce a set of encoded data slices, wherein an encoded data slices of the set of encoded data slices has a slice name with a particular pillar reference.

When the container control module 331 is associated with a DSN, the container control module 331 manages the storage mapping information of a plurality of sets of encoded data slices, wherein the plurality of storage modules are grouped into a set of pillar storage units, wherein encoded data slices of the plurality of sets of encoded data slices having a common pillar reference within their respective slices names are mapped to one of the set of pillar storage units having the common pillar reference, wherein digital information is segmented into digital information segments and wherein a digital information segment of the digital information segments is encoded using a dispersed storage error coding function to produce a set of encoded data slices, wherein an encoded data slices of the set of encoded data slices has a slice name with the common pillar reference.

The container control module 331 is further operable to receive a data access request 346, from a source external to the maintenance-free storage container 330 via the DSN interface 32, and the processing module 332 interprets the data access request 346 based on the storage mapping information 350 to identify one or more of the plurality of storage modules to produce one or more identified storage modules. The data access request 346 is regarding one or more encoded data slices, wherein digital information is segmented into digital information segments and wherein a digital information segment of the digital information segments is encoded using a dispersed storage error coding function to produce a set of encoded data slices. The data includes a plurality of encoded data slices, which includes at least one encoded data slice of the set of encoded data slices. The processing module 332 of the container control module 331 is further operable to generate an in-container data access request 360 based on the data access request 346 and the one or more identified storage modules. The transceiver 334 is operable to transmit the in-container data access request to the one or more identified storage modules. The processing module 332 is further operable to generate an access response 348 and send the access response 348 to the DSN via the DSN interface 32. The access response 348 may include one or more of an encoded data slice (e.g., as a result of a read slice access request 346) and a command.

The container control module 331 is further operable to determine that the data access request is regarding writing encoded data slices that have related slices names (e.g., slice names of contiguous data segments, slice names associated with a common data segment) and identify one of the plurality of storage modules for storing the encoded data slices. Next, the container control module 331 generates related location information (e.g., consecutive sectors for consecutive slice names) for the encoded data slices within the identified one of the plurality of storage modules, updates the storage mapping information 350 based on the related location information, and generates the in-container data access request 360 based on the related location information.

The transceiver 338 of the storage module functions to receive at least a portion of the in-container data access request 360 from the container control module 331. For example, transceiver 338 receives contained wireless signals 362 generated by a transceiver 334 when wireless signals are utilized. Alternatively, transceiver 338 receives wireline signals generated by transceiver 334 one wireline signals are utilized. The control module 340 generates a control signal 364 from the at least a portion of the in-container data access request 360. The control signal 364 includes one or more of a storage medium identifier when the one or more storage mediums 343 includes a plurality of storage mediums 343, position information (e.g. head position), and a sector number (e.g., a disc sector number).

The storage medium interface 342 includes a servo unit and a head unit, wherein the servo unit converts the control signal 364 into a head unit control signal and wherein, in accordance with the head unit control signal, the head unit is positioned relative to a storage medium of the one or more storage mediums to access the data. The storage medium interface 342 functions to access a portion of the data from the one or more storage mediums 343 based on the control signal 364. For example, the storage medium interface 342 converts data 358 into magnetic and/or optical signals for transfer to the storage medium 343 when writing data and detects magnetic and/or optical signals from the storage medium 343 to reproduce data 358 when reading data.

In an encoded data slice retrieval example of operation, the processing module 332 receives an access request 346 (e.g., a slice retrieval request) from the DSN via the DSN interface 32. The processing module 332 accesses the slice location memory 336 to retrieve the storage mapping information 350. Next, the processing module 332 identifies an entry of the storage mapping information 350 utilizing a slice name (e.g., 395C) of the access request 346. The processing module 332 extracts a storage module ID (e.g., storage module 1_3) of the storage module ID field 354 and access request information (e.g., drive 10 sector 9) of the access request information field 356 corresponding to slice name (e.g., 395C) of the slice name field 352. Next, the processing module 332 generates an in-container access request 360 utilizing the access request information. The transceiver 334 converts the access request 360 into contained wireless signals 362 and sends the contained wireless signals 362 to storage module 1_3.

Continuing the preceding example, the transceiver 338 of memory module 1_3 receives the contained wireless signals 362 and provides the access request information 360 to the control module 340. The control module 340 translates the access request information 360 into control signals 364 to operate the storage medium interface 342 to spin the disk across the head such that the head reads bits of a desired slice of the request. The storage medium interface 342 reads data 358 from the storage medium 343 of the desired slice and provides the data 358 to the transceiver 338 of the memory module 1_3. The transceiver 338 converts the data 358 into contained wireless signals 362 and transmits the contained wireless signals 362 to the transceiver 334. The transceiver 334 receives the contained wireless signals 362 and decodes the contained wireless signals 362 to reproduce data 358 (e.g., that includes the desired encoded data slice). The processing module 332 generates an access response 348 that includes the reproduced encoded data slice and sends the access response 348 to the DSN via the DSN interface 32.

In an encoded data slice storage example of operation, the processing module 332 receives an access request 346 that includes a write slice request from the DSN via the DSN interface 32. The processing module 332 retrieves the storage mapping information 350 from the slice location memory 336 to identify an available storage module, an available storage medium 343 (e.g. drive) within the storage module, and an available position within the storage medium 343. The processing module 332 generates a new slice location information entry that includes one or more of a slice name of the request, integrity information of the slice (e.g., a hash over the slice), a storage module ID, a drive ID, and access request information (e.g., position information). The processing module 332 modifies the storage mapping information 350 to include the new slice location information entry and stores the updated storage mapping information 350 in the slice location memory 336.

Continuing the preceding example, the processing module 332 generates an in-container access request 360 that includes access request information and data 358 that includes an encoded data slice of the access request 346. The processing module 332 sends the data 358 and the access request 360 to the selected storage module utilizing the transceiver 334 via contained wireless signals 362. A transceiver 338 associated with the selected storage module receives the contained wireless signals 362 and decodes the contained wireless signals 362 to reproduce the encoded data slice as data 358 and reproduces the access request 360. The control module 340 produces control signals 364 based on the access request 360 to operate the storage medium interface 342 (e.g., servos to spin a disc associated with the drive ID) pass the head such that the storage medium interface 342 (e.g. a head) writes data 358 (e.g., the encoded data slice) to the disk to store the encoded data slice.

Figure 19B:
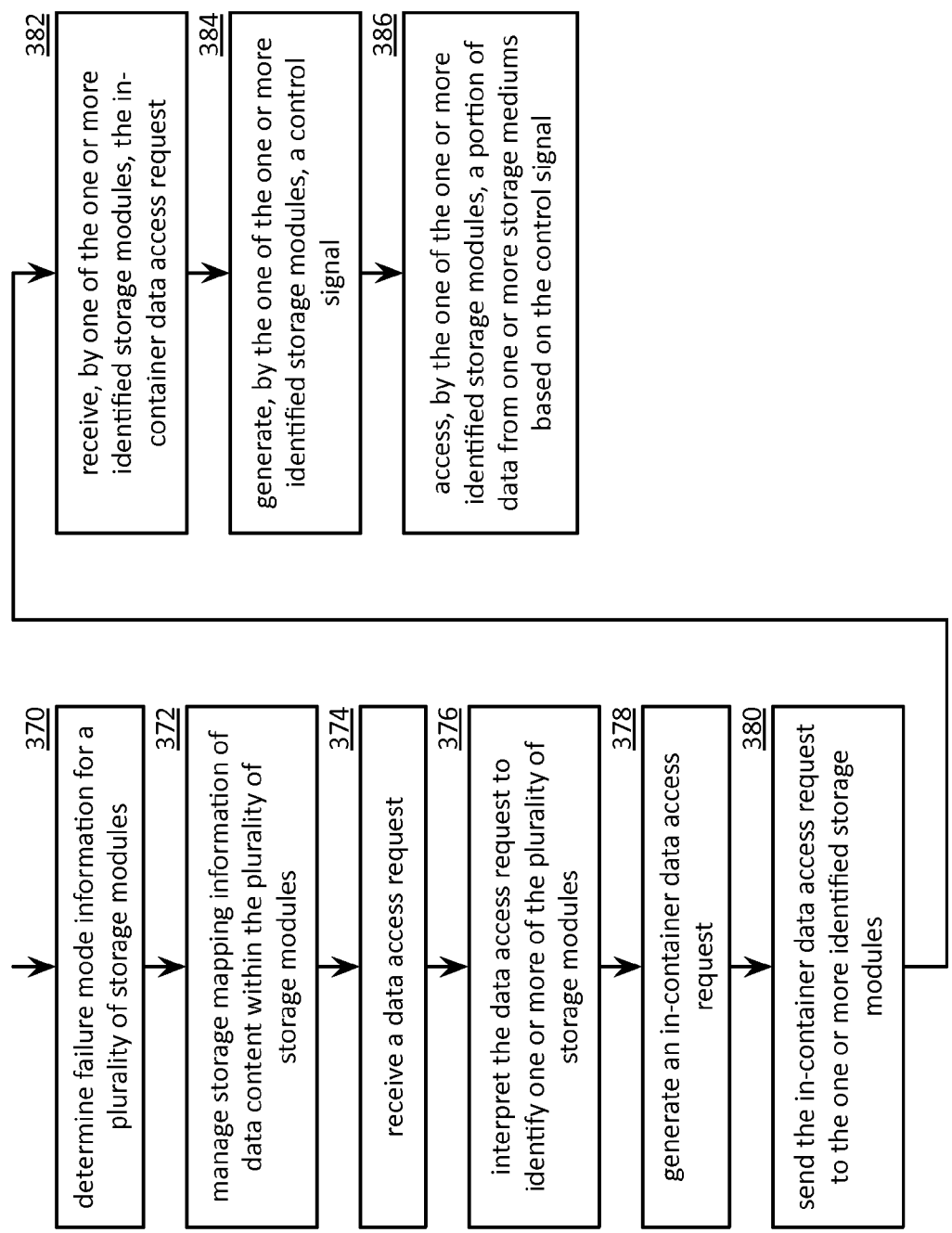
FIG. 19B is a flowchart illustrating an example of accessing a storage module of a maintenance free storage container.

FIG. 19B is a flowchart illustrating an example of accessing a storage module of a maintenance free storage container. The method begins at step 370 where a processing module (e.g., of a container control module) determines failure mode information for a plurality of storage modules of a maintenance-free storage container that allows for multiple storage modules of the plurality of storage modules to be in a failure mode without replacement. The method continues at step 372 where the processing module manages storage mapping information of data content within the plurality of storage modules based on the failure mode information. The managing includes managing the storage mapping information of encoded data slices having common pillar references within their respective slices names within the plurality of storage modules based on the failure mode information, wherein digital information is segmented into digital information segments and wherein a digital information segment of the digital information segments is encoded using a dispersed storage error coding function to produce a set of encoded data slices, wherein an encoded data slices of the set of encoded data slices has a slice name with a particular pillar reference.

The managing further includes managing the storage mapping information of a plurality of sets of encoded data slices, wherein the plurality of storage modules are grouped into a set of pillar storage units, wherein encoded data slices of the plurality of sets of encoded data slices having a common pillar reference within their respective slices names are mapped to one of the set of pillar storage units having the common pillar reference, wherein digital information is segmented into digital information segments and wherein a digital information segment of the digital information segments is encoded using a dispersed storage error coding function to produce a set of encoded data slices, wherein an encoded data slices of the set of encoded data slices has a slice name with the common pillar reference.

The method continues at step 374 where the processing module receives a data access request. The receiving includes receiving the data access request regarding one or more encoded data slices, wherein digital information is segmented into digital information segments, wherein a digital information segment of the digital information segments is encoded using a dispersed storage error coding function to produce a set of encoded data slices, and wherein the data includes a plurality of encoded data slices, which includes at least one encoded data slice of the set of encoded data slices.

The method continues at step 376 where the processing module interprets the data access request based on the storage mapping information to identify one or more of the plurality of storage modules to produce one or more identified storage modules (e.g., a lookup by slice name). The method continues at step 378 where the processing module generates an in-container data access request based on the data access request and the one or more identified storage modules. The method continues at step 380 where the processing module sends the in-container data access request to the one or more identified storage modules.

When the data access request is regarding writing encoded data slices that have related slice names, processing module determines that the data access request is regarding writing encoded data slices that have related slices names and identifies one of the plurality of storage modules for storing the encoded data slices. Next, the processing module generates related location information (e.g., consecutive sectors for consecutive slice names) for the encoded data slices within the identified one of the plurality of storage modules and updates the storage mapping information based on the related location information. Next, the processing module generates the in-container data access request based on the related location information (e.g., position info for both slices).

The method continues at step 382 where one of the one or more identified storage modules receives at least a portion of the in-container data access request from the container interface module. The method continues at step 384 where the one of the one or more identified storage modules generates a control signal from the at least a portion of the in-container data access request. The control signal includes one or more of a storage medium identifier when the one or more storage mediums includes a plurality of storage mediums, position information, and a sector number. The method continues at step 386 where the one of the one or more identified storage modules accesses a portion of data from one or more storage mediums of the by the one of the one or more identified storage modules, based on the control signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A maintenance-free storage container that allows for multiple storage modules of a plurality of storage modules to be in a failure mode without replacement, the maintenance-free storage container comprises:
   a container control module operable to:
      determine failure mode information for the plurality of storage modules;
      manage storage mapping information of data content within the plurality of storage modules based on the failure mode information;
      receive a data access request;
      interpret the data access request based on the storage mapping information to identify one or more of the plurality of storage modules to produce one or more identified storage modules;
      generate an in-container data access request based on the data access request and the one or more identified storage modules; and
   the plurality of storage modules includes a sufficient number of storage modules to provide at least one peta-byte of storage, wherein a storage module of the plurality of storage modules includes:
      a transceiver to receive at least a portion of the in-container data access request from the container interface module;
      a control module to generate a control signal from the at least a portion of the in-container data access request;
      one or more storage mediums for storing data; and
      a storage medium interface to access a portion of the data from the one or more storage mediums based on the control signal.

2. The maintenance-free storage container of claim 1 further comprises:
   the data access request is regarding one or more encoded data slices, wherein digital information is segmented into digital information segments and wherein a digital information segment of the digital information segments is encoded using a dispersed storage error coding function to produce a set of encoded data slices; and
   the data includes a plurality of encoded data slices, which includes at least one encoded data slice of the set of encoded data slices.

3. The maintenance-free storage container of claim 2, wherein the container control module is further operable to:
   determine that the data access request is regarding writing encoded data slices that have related slices names;
   identify one of the plurality of storage modules for storing the encoded data slices;
   generate related location information for the encoded data slices within the identified one of the plurality of storage modules;
   update the storage mapping information based on the related location information; and
   generate the in-container data access request based on the related location information.

4. The maintenance-free storage container of claim 1, wherein the container control module is further operable to:
   manage the storage mapping information of encoded data slices having common pillar references within their respective slices names within the plurality of storage modules based on the failure mode information, wherein digital information is segmented into digital information segments and wherein a digital information segment of the digital information segments is encoded using a dispersed storage error coding function to produce a set of encoded data slices, wherein an encoded data slices of the set of encoded data slices has a slice name with a particular pillar reference.

5. The maintenance-free storage container of claim 1, wherein the container control module is further operable to:
manage the storage mapping information of a plurality of sets of encoded data slices, wherein the plurality of storage modules are grouped into a set of pillar storage units, wherein encoded data slices of the plurality of sets of encoded data slices having a common pillar reference within their respective slices names are mapped to one of the set of pillar storage units having the common pillar reference, wherein digital information is segmented into digital information segments and wherein a digital information segment of the digital information segments is encoded using a dispersed storage error coding function to produce a set of encoded data slices, wherein an encoded data slices of the set of encoded data slices has a slice name with the common pillar reference.

6. The maintenance-free storage container of claim 1, wherein the storage medium interface comprises:
a servo unit; and
a head unit, wherein the servo unit converts the control signal into a head unit control signal and wherein, in accordance with the head unit control signal, the head unit is positioned relative to a storage medium of the one or more storage mediums to access the data.

7. The maintenance-free storage container of claim 6, wherein the control signal comprises one or more of:
a storage medium identifier when the one or more storage mediums includes a plurality of storage mediums;
position information; and
a sector number.

8. The maintenance-free storage container of claim 1, wherein the container control module comprises:
a dispersed storage network (DSN) interface operable to receive the data access request from a source external to the maintenance-free storage container;
a slice location memory operable to store the storage mapping information;
a processing module operable to:
determine the failure mode information;
manage the storage mapping information;
interpret the data access request based on the storage mapping information to identify the one or more identified storage modules; and
generate the in-container data access request based on the data access request and the one or more identified storage modules; and
a transceiver operable to transmit the in-container data access request to the one or more identified storage modules.

9. A method comprises:
determining failure mode information for a plurality of storage modules of a maintenance-free storage container that allows for multiple storage modules of the plurality of storage modules to be in a failure mode without replacement;
managing storage mapping information of data content within the plurality of storage modules based on the failure mode information;
receiving a data access request;
interpreting the data access request based on the storage mapping information to identify one or more of the plurality of storage modules to produce one or more identified storage modules;
generating an in-container data access request based on the data access request and the one or more identified storage modules; and
sending the in-container data access request to the one or more identified storage modules.

10. The method of claim 9 further comprises:
receiving, by one of the one or more identified storage modules, at least a portion of the in-container data access request from the container interface module;
generating, by the one of the one or more identified storage modules, a control signal from the at least a portion of the in-container data access request; and
accessing, by the one of the one or more identified storage modules, a portion of data from one or more storage mediums of the by the one of the one or more identified storage modules, based on the control signal.

11. The method of claim 9 further comprises:
receiving the data access request regarding one or more encoded data slices, wherein digital information is segmented into digital information segments, wherein a digital information segment of the digital information segments is encoded using a dispersed storage error coding function to produce a set of encoded data slices, and wherein the data includes a plurality of encoded data slices, which includes at least one encoded data slice of the set of encoded data slices.

12. The method of claim 11 further comprises:
determining that the data access request is regarding writing encoded data slices that have related slices names;
identifying one of the plurality of storage modules for storing the encoded data slices;
generating related location information for the encoded data slices within the identified one of the plurality of storage modules;
updating the storage mapping information based on the related location information; and
generating the in-container data access request based on the related location information.

13. The method of claim 9 further comprises:
managing the storage mapping information of encoded data slices having common pillar references within their respective slices names within the plurality of storage modules based on the failure mode information, wherein digital information is segmented into digital information segments and wherein a digital information segment of the digital information segments is encoded using a dispersed storage error coding function to produce a set of encoded data slices, wherein an encoded data slices of the set of encoded data slices has a slice name with a particular pillar reference.

14. The method of claim 9 further comprises:
managing the storage mapping information of a plurality of sets of encoded data slices, wherein the plurality of storage modules are grouped into a set of pillar storage units, wherein encoded data slices of the plurality of sets of encoded data slices having a common pillar reference within their respective slices names are mapped to one of the set of pillar storage units having the common pillar reference, wherein digital information is segmented into digital information segments and wherein a digital information segment of the digital information segments is encoded using a dispersed storage error coding function to produce a set of encoded data slices, wherein an encoded data slices of the set of encoded data slices has a slice name with the common pillar reference.

15. The method of claim 9, wherein the control signal comprises one or more of:

a storage medium identifier when the one or more storage mediums includes a plurality of storage mediums;
position information; and
a sector number.

* * * * *